(12) United States Patent
Madhusudan

(10) Patent No.: US 12,237,515 B2
(45) Date of Patent: Feb. 25, 2025

(54) FUEL CELL METALLIC GAS DIFFUSION LAYER

(71) Applicant: Bell Textron Inc., Fort Worth, TX (US)

(72) Inventor: Phalgun Madhusudan, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 154 days.

(21) Appl. No.: 17/508,652

(22) Filed: Oct. 22, 2021

(65) Prior Publication Data

US 2023/0127900 A1   Apr. 27, 2023

(51) Int. Cl.
| | | |
|---|---|---|
| *H01M 4/86* | (2006.01) | |
| *H01M 4/88* | (2006.01) | |
| *H01M 4/92* | (2006.01) | |
| *H01M 8/0232* | (2016.01) | |
| *H01M 8/0245* | (2016.01) | |

(Continued)

(52) U.S. Cl.
CPC ....... *H01M 4/8621* (2013.01); *H01M 4/8657* (2013.01); *H01M 4/8668* (2013.01); *H01M 4/8828* (2013.01); *H01M 4/8882* (2013.01); *H01M 4/8896* (2013.01); *H01M 4/926* (2013.01); *H01M 8/0232* (2013.01); *H01M 8/0245* (2013.01); *H01M 8/0258* (2013.01);
(Continued)

(58) Field of Classification Search
None
See application file for complete search history.

(56) References Cited

U.S. PATENT DOCUMENTS 6,010,606 A * 1/2000 Denton ................. C25B 11/031
429/534
6,232,010 B1   5/2001 Cisar et al.
(Continued)

FOREIGN PATENT DOCUMENTS

EP   1214749 A2   6/2002

OTHER PUBLICATIONS

Fuel Cell Store, "Membrane Electrode Assemblies", https://www.fuelcellstore.com/fuel-cell-components/membrane-electrode-assembly, 4 pages (retrieved from https://web.archive.org/web/20210614212753/https://www.fuelcellstore.com/fuel-cell-components/membrane-electrode-assembly (dated Jun. 14, 2021).

(Continued)

*Primary Examiner* — Haroon S. Sheikh
(74) *Attorney, Agent, or Firm* — Slater Matsil, LLP

(57) ABSTRACT

In certain embodiments, an apparatus includes an electrolyte membrane layer (EML), and includes a first electrode catalyst layer (ECL) and a first metallic gas diffusion layer (MGDL) positioned to a first side of the EML such that the first ECL is positioned between the first MGDL and the EML. The first MGDL includes a metal-containing layer and a coating of porous material disposed on a surface of the metal-containing layer of the first MGDL that faces the first ECL. The apparatus further includes a second ECL and a second MGDL positioned to the second side of the EML such that the second ECL is positioned between the second MGDL and the EML. The second MGDL includes a metal-containing layer and a coating of porous material disposed on a surface of the metal-containing layer of the second MGDL that faces the second ECL.

20 Claims, 14 Drawing Sheets

(51) Int. Cl.
H01M 8/0258 (2016.01)
H01M 8/10 (2016.01)
H01M 8/1004 (2016.01)

(52) U.S. Cl.
CPC .. *H01M 8/1004* (2013.01); *H01M 2008/1095* (2013.01)

(56) References Cited

U.S. PATENT DOCUMENTS

| | | | |
|---|---|---|---|
| 7,132,192 B2 | 11/2006 | Muthuswamy et al. | |
| 8,129,065 B2 | 3/2012 | Schrooten et al. | |
| 8,647,787 B2 * | 2/2014 | Kulakov | H01M 4/8821 429/444 |
| 9,466,851 B2 | 10/2016 | Tsubosaka | |
| 2005/0271921 A1 * | 12/2005 | Kim | H01M 4/8807 429/480 |
| 2006/0068268 A1 * | 3/2006 | Olmeijer | H01M 4/8652 427/115 |
| 2006/0078784 A1 | 4/2006 | Liu et al. | |
| 2007/0072056 A1 | 3/2007 | Oh et al. | |
| 2009/0169962 A1 * | 7/2009 | Hsing | H01M 4/8605 429/415 |
| 2009/0317686 A1 * | 12/2009 | Huston | H01M 8/1039 429/432 |
| 2010/0136457 A1 * | 6/2010 | Yamada | H01M 8/1007 429/480 |
| 2012/0034548 A1 * | 2/2012 | Okuyama | H01M 4/8807 429/480 |
| 2019/0044159 A1 * | 2/2019 | Miyamoto | C22C 13/00 |
| 2020/0274180 A1 | 8/2020 | Kim et al. | |
| 2020/0280085 A1 * | 9/2020 | Oka | H01M 8/0273 |
| 2020/0287220 A1 | 9/2020 | Sode et al. | |
| 2020/0328444 A1 | 10/2020 | Endo et al. | |
| 2020/0331212 A1 | 10/2020 | Kim | |
| 2020/0335808 A1 | 10/2020 | Hamada | |
| 2020/0358118 A1 | 11/2020 | Min | |
| 2020/0365922 A1 | 11/2020 | Kishi | |
| 2021/0013524 A1 | 1/2021 | Ozawa et al. | |
| 2021/0028476 A1 | 1/2021 | Jilani et al. | |
| 2021/0057760 A1 | 2/2021 | Kim et al. | |
| 2021/0062300 A1 | 3/2021 | Tsuchida et al. | |
| 2021/0098808 A1 | 4/2021 | Al-Smail | |
| 2021/0104766 A1 | 4/2021 | Kato et al. | |
| 2021/0119237 A1 | 4/2021 | Lee et al. | |
| 2021/0126262 A1 | 4/2021 | Bashyam et al. | |
| 2021/0143460 A1 | 5/2021 | Ishimoto et al. | |
| 2021/0159510 A1 | 5/2021 | Kim | |
| 2021/0167400 A1 | 6/2021 | Yamasaki et al. | |
| 2021/0167409 A1 | 6/2021 | Tsubosaka | |
| 2021/0167410 A1 | 6/2021 | Suzuki | |
| 2021/0175515 A1 | 6/2021 | Kishimoto et al. | |
| 2021/0184223 A1 | 6/2021 | Park et al. | |
| 2021/0184224 A1 * | 6/2021 | Kawai | H01M 8/0232 |
| 2021/0184225 A1 | 6/2021 | Yamanishi et al. | |
| 2021/0194029 A1 | 6/2021 | Nan et al. | |
| 2021/0226241 A1 | 7/2021 | Adachi et al. | |
| 2021/0242481 A1 | 8/2021 | Kim et al. | |
| 2021/0280884 A1 | 9/2021 | Thomas et al. | |

OTHER PUBLICATIONS

Fuel Cells Etc., "What is the Purpose of a Gas Diffusion Layer (GDL)", https://fuelcellsetc.com/2013/02/purpose-of-a-gas-diffusion-layer-gdl/, published Feb. 26, 2013, 2 pages (https://web.archive.org/web/20210123034031/https://fuelcellsetc.com/2013/02/purpose-of-a-gas-diffusion-layer-gdl/ (dated Jan. 23, 2021).

Jayakumar et al., " Manufacturing the Gas Diffusion Layer for PEM Fuel Cell Using a Novel 3D Printing Technique and Critical Assessment of the Challenges Encountered", www.mdpi.com/journal/materials, published Jul. 14, 2017, 9 pages.

Office of Energy Efficiency & Renewable Energy, "Parts of a Fuel Cell", https://www.energy.gov/eere/fuelcells/parts-fuel-cell, 4 pages (retrieved from https://web.archive.org/web/20210514114347/https://www.energy.gov/eere/fuelcells/parts-fuel-cell (dated May 14, 2021).

Smithsonian Institution, "Fuel Cell Basics", https://americanhistory.si.edu/fuelcells/basics.htm, 2017, 6 pages (retrieved from https://web.archive.org/web/20210906105506/https://americanhistory.si.edu/fuelcells/basics.htm (dated Sep. 6, 2021)).

Wikipedia, "Fuel Cell", https://en.wikipedia.org/wiki/Fuel_cell, 38 pages (retrieved from https://web.archive.org/web/20211019220516/https://en.wikipedia.org/wiki/Fuel_cell (dated Oct. 19, 2021)).

* cited by examiner

FUEL CELL METALLIC GAS DIFFUSION LAYER

TECHNICAL FIELD

This disclosure relates generally to power source technology, and, in particular embodiments, to a fuel cell metallic gas diffusion layer.

BACKGROUND

Powering machines or other devices remains a challenge. Such devices or machines may include mobile or otherwise portable apparatuses that use power when not connected to a mains power supply, or apparatuses that may use power when the mains power supply (or a connection to such a mains power supply) fails, such as through a backup power supply. An example power supply is a fuel cell. Fuel cells may be used as power sources for mobile phones, laptop computers, electric vehicles, hybrid electric vehicles, manned aerial vehicles, unmanned aerial vehicles, and many other electronic apparatuses/machines.

SUMMARY

In certain embodiments, an apparatus includes an electrolyte membrane layer, a first electrode catalyst layer positioned to a first side of the electrolyte membrane layer, and a first metallic gas diffusion layer positioned to the first side of the electrolyte membrane layer such that the first electrode catalyst layer is positioned between the first metallic gas diffusion layer and the electrolyte membrane layer. The first metallic gas diffusion layer includes a metal-containing layer and a first coating of porous material disposed on a first surface of the metal-containing layer of the first metallic gas diffusion layer. The first surface of the metal-containing layer of the first metallic gas diffusion layer faces the first electrode catalyst layer. The apparatus further includes a second electrode catalyst layer positioned to a second side of the electrolyte membrane layer and a second metallic gas diffusion layer positioned to the second side of the electrolyte membrane layer such that the second electrode catalyst layer is positioned between the second metallic gas diffusion layer and the electrolyte membrane layer. The second metallic gas diffusion layer includes a metal-containing layer and a first coating of porous material disposed on a first surface of the metal-containing layer of the second metallic gas diffusion layer. The first surface of the metal-containing layer of the second metallic gas diffusion layer faces the second electrode catalyst layer.

In certain embodiments, a method includes forming first and second metallic gas diffusion layers for a fuel cell. Forming each of the first and second metallic gas diffusion layers includes providing a metal-containing layer and applying a first porous coating on a first surface of the metal-containing layer. The method further includes depositing a first electrode catalyst layer on the first porous coating of the first metallic gas diffusion layer and depositing a second electrode catalyst layer on the first porous coating of the second metallic gas diffusion layer. The method further includes coupling the first metallic gas diffusion layer and the first electrode catalyst layer to a first side of an electrolyte membrane layer and the second metallic gas diffusion layer and the second electrode catalyst layer to a second side of the electrolyte membrane layer. The first electrode catalyst layer is positioned between the first metallic gas diffusion layer and the electrolyte membrane layer to the first side of the electrolyte membrane layer, and the second electrode catalyst layer is positioned between the second metallic gas diffusion layer and the electrolyte membrane layer to the second side of the electrolyte membrane layer.

In certain embodiments, a method includes forming first and second metallic gas diffusion layers for a fuel cell. Forming each of the first and second metallic gas diffusion layers includes providing a metal-containing layer and applying a first porous coating on a first surface of the metal-containing layer. The method further includes providing an electrolyte membrane layer having a first catalyst layer disposed on a first surface of the electrolyte membrane layer and a second catalyst layer disposed on a second surface of the electrolyte membrane layer, the first surface of the electrolyte membrane layer being opposite the first surface of the electrolyte membrane layer. The method further includes coupling the first metallic gas diffusion layer to a first side of the electrolyte membrane layer and the second metallic gas diffusion layer to a second side of the electrolyte membrane layer such that the first catalyst layer is positioned between the first metallic gas diffusion layer and the electrolyte membrane layer to the first side of the electrolyte membrane layer and the second catalyst layer is positioned between the second metallic gas diffusion layer and the electrolyte membrane layer to the second side of the electrolyte membrane layer. The first porous coating on the first surface of the metal-containing layer of the first metallic gas diffusion layer contacts the first catalyst layer, and the first porous coating on the first surface of the metal-containing layer of the second metallic gas diffusion layer contacts the second catalyst layer.

BRIEF DESCRIPTION OF THE DRAWINGS

For a more complete understanding of this disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
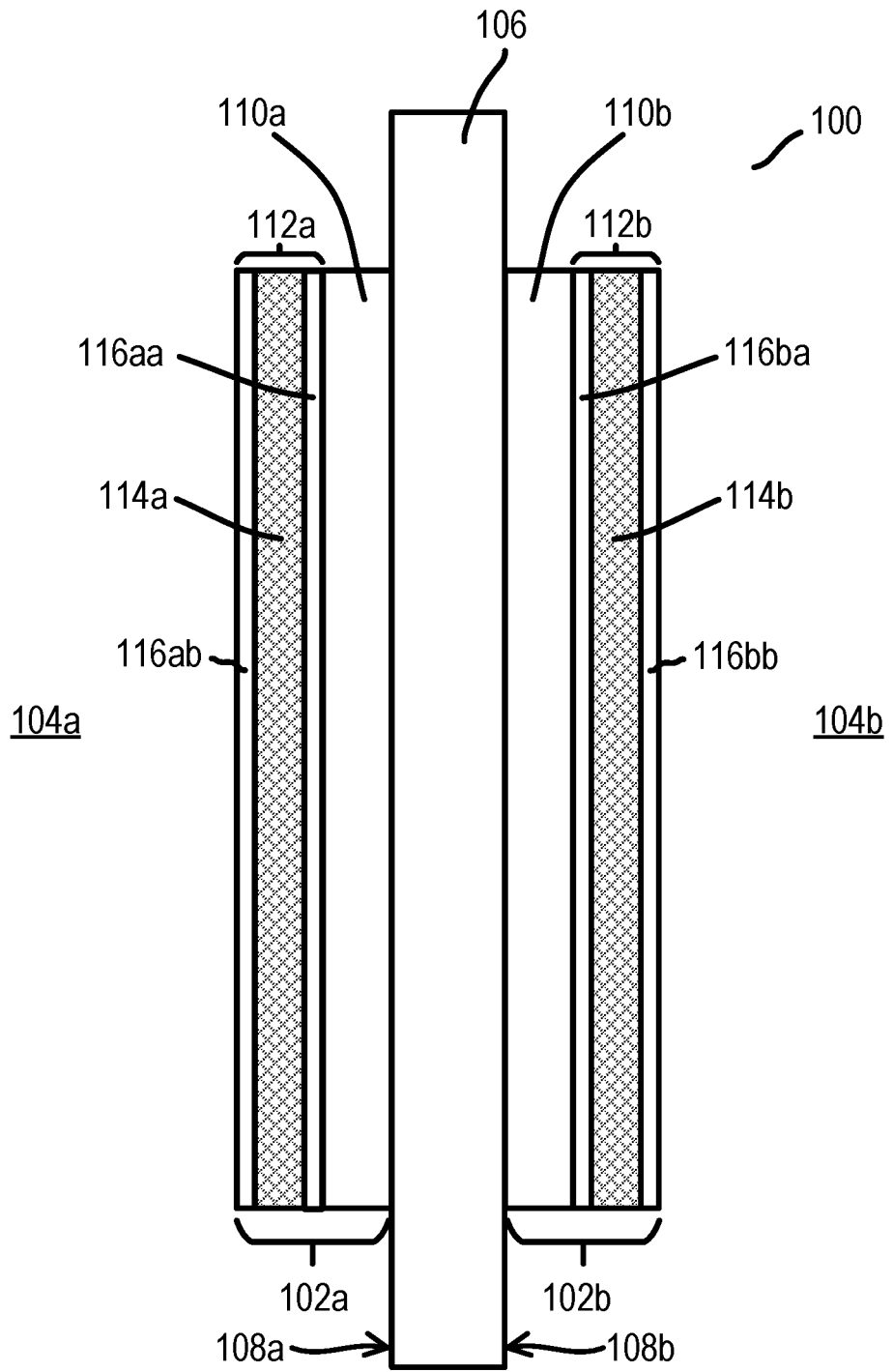
FIG. 1 illustrates a cross-sectional view of an example fuel cell membrane electrode assembly that includes a metallic gas diffusion layer, according to certain embodiments.

A fuel cell is an electrochemical cell that converts the chemical energy of a fuel (e.g., hydrogen) and an oxidizing agent (e.g., oxygen, which may be continuously provided through an inflow of air) into electricity through an oxidation reaction and a reduction reaction, often collectively called an oxidation-reduction, or redox, reaction. A fuel cell may include a first electrode (e.g., an anode, which may be considered a negative electrode) and a second electrode (e.g., a cathode, which may be considered a positive electrode) separated by an electrolyte membrane (e.g., a polymer electrode membrane). Each electrode may include a gas diffusion layer and a catalyst layer, with the catalyst layer being positioned between the gas diffusion layer and the electrolyte membrane. The combination of the electrodes and the electrolyte membrane may be referred to as a membrane electrode assembly, or MEA.

A fuel for a fuel cell may include hydrogen, ethanol, or a variety of other possible fuels. In general, an oxidation reaction, or a loss of electrons, occurs at the anode, and a reduction reaction, or a gain of electrons, occurs at the cathode. The fuel is passed over the gas diffusion layer of the anode electrode, and the gas diffusion layer may distribute the fuel (e.g., hydrogen gas) along an interface of the gas diffusion layer and the adjacent anode catalyst layer. The anode catalyst layer may facilitate separating the fuel into electrons and positively-charged ions. The electrons are carried by the gas diffusion layer to a terminal to power a device. For example, the gas diffusion layer may facilitate carrying the electrons to a current collector, which may carry the electrons to a negative terminal for powering a device. The positively-charged ions travel over the anode catalyst layer that is adjacent to the anode gas diffusion layer and through the electrolyte membrane to the cathode electrode. Although this disclosure focuses on an example in which the fuel cell is a proton exchange membrane fuel cell (PEMFC), this disclosure contemplates using the elements and techniques described herein with any suitable types of fuel cells, including, for example, fuel cells that employs a reversed polarity of ions (e.g., alkaline exchange membrane fuel cells (AEMFCs).

Continuing with the example of a PEMFC, on the cathode side, the electrons reenter the fuel cell through a positive terminal of the fuel cell, which carries the electrons to the cathode gas diffusion layer, and the positively-charged ions pass through the cathode catalyst layer. The cathode gas diffusion layer assists in transporting the electrons and a reactant gas, such as oxygen gas from a continuous supply of air, to the cathode catalyst layer, which facilitates a reaction involving the electrons, the positively-charged ions, and the reactant gas to form a byproduct, such as water.

Fuel cells may take various forms and be implemented to process various types of fuels and oxidants/oxidizers. Example fuels may include hydrogen, ethanol, methanol, sodium borohydride, or any other suitable type of fuel for a fuel cell. Example oxidants/oxidizers may include air, oxygen, oxygen-rich liquids and solutions (e.g., hydrogen peroxide or alkaline potassium permanganate/dichromate, respectively), or any other suitable type of oxidants/oxidizers for a fuel cell. Although this disclosure is described primarily using the example of a hydrogen fuel cell, this disclosure contemplates any suitable types of fuel cells and associated membrane electrode assemblies. Furthermore, individual fuel cells may be combined together in various ways, such as assembled in a stack, to provide greater amounts of electricity.

FIG. 1 illustrates a cross-sectional view of an example fuel cell membrane electrode assembly 100 that includes a metallic gas diffusion layer, according to certain embodiments. In general, membrane electrode assembly 100 includes a first electrode 102a positioned to a first side 104a of an electrolyte membrane layer 106, and a second electrode 102b positioned to a second side 104b of electrolyte membrane layer 106. For example, first electrode 102a may be disposed on a first surface 108a of electrolyte membrane layer 106, and second electrode 102b may be disposed on a second surface 108b of electrolyte membrane layer 106.

First electrode 102a and second electrode 102b may be referred to generally as electrodes 102. One of first electrode 102a and second electrode 102b may act as an anode in a fuel cell, while the other of first electrode 102a and second electrode 102b may act as a cathode in the fuel cell. For simplicity, throughout the remainder of this disclosure it primarily will be assumed that first electrode 102a is configured to act as an anode in a fuel cell and second electrode 102b is configured to act as a cathode in the fuel cell.

Electrodes 102 each include an electrode catalyst layer 110 and a metallic gas diffusion layer 112. For example, electrode 102a includes electrode catalyst layer 110a and metallic gas diffusion layer 112a, while electrode 102b includes electrode catalyst layer 110b and metallic gas diffusion layer 112b. Electrode catalyst layers 110a and 110b may be referred to generally as electrode catalyst layers 110, and metallic gas diffusion layers 112a and 112b may be referred to generally as metallic gas diffusion layers 112.

Electrode catalyst layers 110 may include any material(s) suitable to act as an anode or a cathode in a fuel cell. In the case of an anode, the material of electrode catalyst layer 110 may include a catalyst material and an ion-conducting polymer (e.g., an ionomer), and may facilitate the splitting of the fuel (e.g., hydrogen) into protons (e.g., positively-charged ions) and electrons. In the case of a cathode, the material of electrode catalyst layer 110 may include a catalyst material and an ion-conducting polymer (e.g., an ionomer), and may facilitate the reduction of the oxygen by reacting with the protons resulting from the splitting of the fuel (e.g., hydrogen) by the anode (and passing through electrolyte membrane layer 106) to produce water or another byproduct. In particular, the electrode catalyst layers 110a and 110b of electrodes 102a and 102b, respectively, may conduct the positively-charged ions resulting from dividing the fuel into electrodes and positively-charged ions, and thereby move those positively-charged ions from the anode to the cathode.

As particular examples, the catalyst material of electrode catalyst layers 110 may include platinum, platinum alloys with transition metals, platinum-ruthenium alloy, platinum de-alloy, palladium, core-shell, non-precious metal, shape-controlled nanocrystals, extended platinum surfaces, nanoframes, or other materials/structures, and may be in black (or pure) form or a supported form. In supported form, the support material may include carbon or another suitable material. The same or different catalyst materials may be used for each of electrode catalyst layers 110a and 110b. The ionomer(s) in each electrode catalyst layers 110 may facilitate the movement of protons through electrode catalyst layers 110. The same or different ionomers may be used for each of electrode catalyst layers 110a and 110b.

Although electrode catalyst layers 110 may have any suitable thicknesses, in certain embodiments, electrode catalyst layers 110 are about 2 microns (m) to about 8 m thick. Additionally, electrode catalyst layer 110a and electrode catalyst layer 110b may have the same or different thicknesses relative to one another. Although electrode catalyst layers 110 may have any suitable areal density (also referred to as loading), in certain embodiments, electrode catalyst layers have an areal density of about 4 milligrams per square centimeter ($mg/cm^2$) to about 8 $mg/cm^2$, and may have the same or different areal densities relative to one another. It should be understood that throughout this description, the terms "layer(s)," "coating(s)," and the like may include a single application (or combination of materials) or multiple applications of a material (or combination of materials).

In certain embodiments, electrode catalyst layer 110a, configured to act as an anode in a fuel cell, comprises any material suitable for an anode in a fuel cell, which may depend on the type of fuel cell and/or other factors. In certain embodiments, electrode catalyst layer 110b, configured to act as a cathode in a fuel cell, comprises any material suitable for a cathode in a fuel cell, which may depend on the type of fuel cell and/or other factors. As an example, for a fuel cell in which the fuel is ethanol, electrode catalyst layers 110a and 110b may include different materials. As another example, for a fuel cell in which the fuel is hydrogen, electrode catalyst layers 110a and 110b may include the same materials (e.g., platinum for both electrode catalyst layers 110a and 110b). Regardless of the type of fuel cell, however, this disclosure contemplates using any suitable material or combination of materials for electrode catalyst layers 110a and 110, whether the same or different.

Metallic gas diffusion layers 112a and 112b, which may be referred to generally as metallic gas diffusion layers 112, are positioned to sides of electrode catalyst layers 110a and 110b, respectively, that face away from electrolyte membrane layer 106. For example, metallic gas diffusion layer 112a is positioned to a first side 104a of electrolyte membrane layer 106 such that electrode catalyst layer 110a is positioned between metallic gas diffusion layer 112a and electrolyte membrane layer 106. As another example, metallic gas diffusion layer 112b is positioned to a second side 104b of electrolyte membrane layer 106 such that electrode catalyst layer 110b is positioned between metallic gas diffusion layer 112b and electrolyte membrane layer 106.

Metallic gas diffusion layers 112 facilitate the movement and distribution of reactants to electrode catalyst layers 110. For example, metallic gas diffusion layer 112a may facilitate the transport and distribution of a fuel (e.g., hydrogen) to electrode catalyst layer 110a. As another example, metallic gas diffusion layer 112b may facilitate the transport and distribution of a reactant (e.g., air or oxygen) to electrode catalyst layer 110b. Metallic gas diffusion layers 112 also may facilitate the removal of water from the fuel cell.

Metallic gas diffusion layers 112 include a metal-containing layer 114 and one or more coatings 116 of porous material, which also may be referred to as porous coatings 116. For example, metallic gas diffusion layer 112a includes metal-containing layer 114a and a first coating 116aa of porous material. First coating 116aa of porous material is disposed on a surface of metal-containing layer 114a that faces electrode catalyst layer 110a of electrode 102a. First coating 116aa of porous material may contact electrode catalyst layer 110a. As another example, metallic gas diffusion layer 112b includes metal-containing layer 114b and a first coating 116ba of porous material. First coating 116ba of porous material is disposed on a surface of metal-containing layer 114b that faces electrode catalyst layer 110b of electrode 102b. First coating 116ba of porous material may contact electrode catalyst layer 110b.

In certain embodiments, a second coating 116 of porous material may be disposed on another surface of metal-containing layers 114 of metallic gas diffusion layers 112. For example, metallic gas diffusion layer 112a includes a second coating 116ab of porous material disposed on a surface of metal-containing layer 114a that faces away from electrode catalyst layer 110a of electrode 102a. As another example, metallic gas diffusion layer 112b includes a second coating 116bb of porous material disposed on a surface of metal-containing layer 114b that faces away from electrode catalyst layer 110b of electrode 102b.

Metal-containing layers 114 provide an inherently conductive substrate for metallic gas diffusion layers 112. Metal-containing layers 114 may include any suitable metal or metal alloy. For example, metal-containing layers 114 may include any suitable combination of copper, nickel, aluminum, stainless steel, silver, a copper-nickel blend, or any other suitable metal or metal alloy. The appropriate material for metal-containing layer 114 may depend on the type of fuel cell being constructed, including the type of fuel to be used. In certain embodiments, methanol and ethanol fuel cells may perform better using nickel-based metal-containing layers 114 relative to copper-based metal-containing layers 114.

Metal-containing layers 114 may be at least partially porous. For example, each metal-containing layer 114 may be implemented as a metal-containing mesh, a non-woven metal-containing fabric-style material, a metal-containing foam, or another suitable material. As a particular example, metal-containing layer 114 may be a 100 grade or non-woven, such as OPTIVEIL currently manufactured by TECHNICAL FIBRE PRODUCTS INC. As another example, metal-containing layer 114 may be a stainless steel non-woven, such as SWIFTFELT metal felt filter media manufactured by SWIFT FILTERS, INC. As other particular examples, metal-containing layer 114 may include any of a variety of conductive fabrics/meshes available from NANO3D SYSTEMS, LLC., such as a nickel-copper-coated conductive non-woven fabric, a stainless steel conductive fabric, or a silver conductive fabric. As another particular example, metal-containing layer 114 may be standard 200 copper mesh.

In certain embodiments, the suitable pore size of a metal-containing layer 114 is about 1 μm to about 100 μm, though this disclosure is not limited to any particular pore size. The suitable size of the pores of a metal-containing layer 114 that results in optimum may vary according to a variety of factors in a given implementation, such as the fuel to be used and/or other factors. In certain embodiments, smaller pores may be appropriate for hydrogen fuel cells relative to methanol or ethanol fuel cells. It should be understood that these are just example ranges and considerations that may not apply to particular implementations.

The content (e.g., the particular metal, metal alloy, etc.) and form (e.g., mesh, foam, or other suitable porous form) of metal-containing layer 114a of metallic gas diffusion layer 112a may be the same as or different than the content and form of metal-containing layer 114b of metallic gas diffusion layer 112b. Although metal-containing layers 114 may have any suitable thickness, in certain embodiments, metal-containing layers 114 are about 0.01 mm to about 0.03 mm thick, potentially depending on the fuel and oxidizer to be used, and on the porosity and density of networks formed, and may have the same or different thicknesses relative to one another. The thickness of metal-containing layers 114 might or might not affect performance of a fuel cell incorporating the metallic gas diffusion layers 112 that include metal-containing layers 114. In certain embodiments, relatively thinner metal-containing layers 114 may allow for thinner fuel cells to be formed, which may be desirable in certain applications.

This disclosure contemplates using any suitable material or combination of materials as the porous materials of coatings 116. The porous materials of coatings 116 may be described as porous solids. The pores of the porous material(s) of coatings 116 may have any suitable sizes and shapes, including any suitable diameters or combination of diameters. In certain embodiments, the diameters of the pores of the porous material(s) of coatings 116 may be about 2 nm or less, which typically means that the porous material(s) is referred to as a microporous material (or, possibly, a supermicroporous (about 0.7 nm to about 2 nm), ultramicroporous (less than about 0.7 nm), or submicroporous material (less than about 0.4 nm)). In certain embodiments, the diameters of the pores of the porous material(s) of coatings 116 may be about 2 nm to about 50 nm, which typically means that the porous material(s) is referred to as a mesoporous material. In certain embodiments, the diameters of the pores of the porous material(s) of coatings 116 may be greater than about 50 nm, which typically means that the porous material(s) is referred to as a macroporous material.

The material that makes up the porous material of coatings 116 may include any suitable type of material for the fuel cell in which membrane electrode assembly 100 will be used. In certain embodiments, the porous material of coatings 116 includes a high surface area carbon black or activated carbon of various forms. In certain embodiments, the porous material of coatings 116 may include a charcoal, such as biochar. In certain embodiments, the porous materials of coatings 116 are formed using a porous ink that is a slurry formed from a powder, a hydrophobic binder, and (during deposition) a solvent. As just one particular example, the powder may include a carbon powder (e.g., a high surface area carbon black or activated carbon of various forms), the hydrophobic binder may include polytetrafluoroethylene (PTFE), and the solvent may include ethanol or isopropyl alcohol. Examples of carbon powders are BLACK PEARLS currently manufactured by CABOT CORPORATION and KETJENBLACK manufactured by AKZO NOBEL N.V. An example of PTFE is TEFLON currently manufactured by THE CHEMOURS COMPANY.

The content and/or thickness of the various coatings 116 of porous materials may be the same or different. Although coatings 116 may have any suitable thickness, in certain embodiments, coatings 116 are about 2 µm to about 10 µm thick, potentially depending on the fuel and oxidizer to be used, and on the porosity and density of networks formed, and may have the same or different thicknesses relative to one another. Although coatings 116 may have any suitable areal density, in certain embodiments, coatings 116 have an areal density of about 4 mg/cm$^2$ to about 7 mg/cm$^2$, and may have the same or different areal densities relative to one another.

Including a metal-containing layer 114 as part of metallic gas diffusion layer 112 may improve conductivity of the gas diffusion layer (and the resulting membrane electrode assembly 100 and fuel cell into which metallic gas diffusion layer 112 is incorporated) relative to conventional gas diffusion layers, allowing current to flow more efficiently to/from the electrode 102 (and particularly to/from the metallic gas diffusion layer 112) from/from a terminal. Additionally or alternatively, including a metal-containing layer 114 as part of metallic gas diffusion layer 112 may improve thermal performance of metallic gas diffusion layer 112 (and the resulting membrane electrode assembly 100 and fuel cell into which metallic gas diffusion layer 112 is incorporated) relative to conventional gas diffusion layers by allowing heat to be distributed more uniformly throughout metallic gas diffusion layer 112 relative to conventional gas diffusion layers. A more uniform distribution of heat may allow the generated heat to be cooled more effectively and/or more efficiently.

In certain embodiments, metal-containing layers 114 may have a higher porosity than conventional gas diffusion layers and/or than porous material to be used for coatings 116. Due to the open spaces of metal-containing layers 114 that may be desirable for maintaining suitable air flow in metallic gas diffusion layers 112, coating one or more surfaces of the metal-containing layer 114 of metallic gas diffusion layer 112 with a porous material (coatings 116) may increase the surface area of metallic gas diffusion layer 112 that contacts the fuel (e.g., a reagent such as ethanol or hydrogen) or air, which may allow such a metallic gas diffusion layer 112 to operate as a gas diffusion layer while also providing the improved conductivity and/or porosity resulting from the inclusion of metal-containing layer 114. Additionally or alternatively, the porous material may make the resulting metallic gas diffusion layer 112 substantially or completely impervious to moisture or water, thereby substantially preventing the flow of moisture or water into electrode catalyst layers 110 and/or electrolyte membrane layer 106.

Electrolyte membrane layer 106 is a semipermeable membrane that generally conducts or otherwise facilitates the passage of positively-charged ions from the anode to the cathode (e.g., from electrode 102a to electrode 102b) while substantially or entirely blocking the passage of electrons from the anode to the cathode (e.g., from electrode 102a to electrode 102b). Electrolyte membrane layer 106 may include any material suitable for allowing positively-charged ions to travel, by conduction for example, from the anode to the cathode while substantially or entirely blocking the passage of electrons from the anode to the cathode (e.g., from electrode 102a to electrode 102b). Although primarily described as facilitating the passage of positively-charged ions such as may be appropriate for a PEMFC, it should be understood that this disclosure contemplates electrolyte membrane layer 106 facilitating the passage of anions such as may appropriate for an AEMFC. That is, electrolyte membrane layer 106 may be implemented in a suitable manner for the particular fuel cell into which membrane electrode assembly 100 is to be incorporated. Electrolyte membrane layer 106 also may substantially or entirely block, through an insulating property, the flow of oxygen (or other suitable gas) from the cathode to the anode (e.g., from electrode 102b to electrode 102a). In some implementations, electrolyte membrane layer 106 also may be referred to as a polymer electrolyte membrane.

Electrolyte membrane layer 106 may be, in part, a film or other structure formed from a polymer, such as a polyolefin, polyethylene, polypropylene, or another suitable material. Electrolyte membrane layer 106 may be made from ionomers. In certain embodiments, electrolyte membrane layer 106 may be made from a pure polymer membrane or from a composite membrane in which other materials are embedded in a polymer matrix. As a particular example, and depending at least in part on the polarity of the ion to be conducted across electrolyte membrane layer 106, electrolyte membrane layer 106 may include fluoropolymer such as a proton exchange membrane like NAFION manufactured by DUPONT, a bipolar exchange membrane like FUMASEP manufactured by FUMATECH BWT GMBH, or an anion exchange membrane like TOKUYAMA A201 manufactured by TOKUYAMA CORPORATION or AEMION manufactured by IONOMR INNOVATIONS INC.

Although electrolyte membrane layer 106 may have any suitable thickness, in certain embodiments, electrolyte membrane layer 106 is about 100 µm to about 200 µm thick. In other cases, electrolyte membrane layer 106 is less than about 100 µm, less than about 50 µm, less than about 40 µm, less than about 30 µm, less than about 20 µm, or less than about 10 µm. The particular thickness that is appropriate may depend on the material of electrolyte membrane layer 106 and the type of fuel being used for the fuel cell.

In one example, electrode catalyst layers 110a and 110b are combined with respective metallic gas diffusion layers 112a and 112b prior to being combined with electrolyte membrane layer 106. In another example, electrode catalyst layers 110a and 110b are combined with electrolyte membrane layer 106 prior to combining the resulting structure with metallic gas diffusion layers 112a and 112b. In the latter example, which may be referred to as a catalyst coated membrane (CCM) technique, the combined structure of electrolyte membrane layer 106 and electrode catalyst layers 110a/110b may be purchased from a suitable supplier or may be formed as part of the process for forming membrane electrode assembly 100.

Although both electrodes 102a and 102b of membrane electrode assembly 100 are shown to include a metallic gas diffusion layer 112a and 112b, respectively, this disclosure contemplates forming a membrane electrode assembly that uses a metallic gas diffusion layer on only one side of an electrolyte membrane layer (e.g., for only one of the anode or cathode).

Although particular values are described, whether forming an anode (e.g., electrode 102a), a cathode (e.g., electrode 102b), or electrolyte membrane layer 106, this disclosure contemplates the applicable layers having any suitable areal density and being deposited to any suitable thickness. The areal density and/or thickness of various layers may affect energy storage and/or efficiency of membrane electrode assembly 100. To that end, to optimize electrode volume, electrode weight, and material use, in certain embodiments the areal density and/or thicknesses of various layers of membrane electrode assembly 100 may be chosen so that the energy storage capabilities of the anode (e.g., electrode 102a) and the cathode (e.g., electrode 102b) are compatible and optimize efficiency.

Figure 2A:
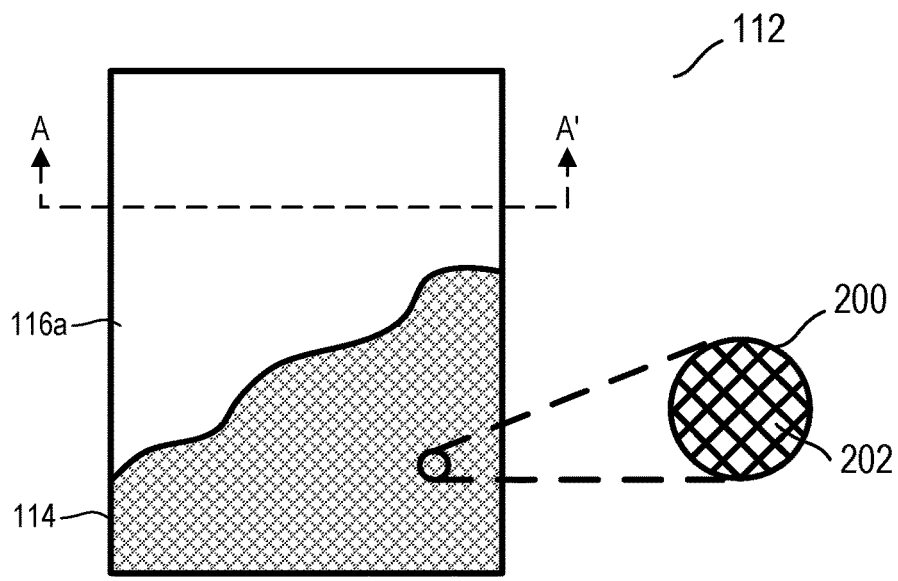
FIGS. 2A-2B illustrate plan and cross-sectional views, respectively of metallic gas diffusion layer, according to certain embodiments.
Figure 2B:
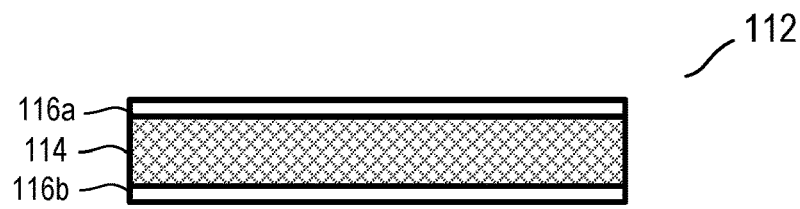

FIGS. 2A-2B illustrate plan and cross-sectional views, respectively of metallic gas diffusion layer 112, according to certain embodiments. The cross-sectional view of FIG. 2B is taken along a cross-section A-A' of FIG. 2A.

As illustrated in FIG. 2A, metallic gas diffusion layer 112 includes metal-containing layer 114 and a coating 116a of porous material deposited on a first surface of metal-containing layer 114, a portion of coating 116a having been removed (or not yet deposited, as the case may be) for illustrative purposes to reveal metal-containing layer 114. As illustrated in FIG. 2A, and in particular in magnified portion 200, metal-containing layer 114 includes openings 202.

Note that the content of magnified portion 200 may not correspond exactly to the content of the portion of metal-containing layer 114 shown to be magnified, and is meant for illustrative purposes only. The particular size and shape of openings 202 and metal-containing layer 114 are provided as examples only. As illustrated in FIG. 2B, a second coating 116b of porous material is deposited on a second surface of metal-containing layer 114.

It should be understood that although coatings 116a and 116b of porous material are shown to be discretely deposited on opposing respective surfaces of metal-containing layer 114, porous material of coatings 116a and/or 116b may be present within openings 202 of metal-containing layer 114.

Figure 3:
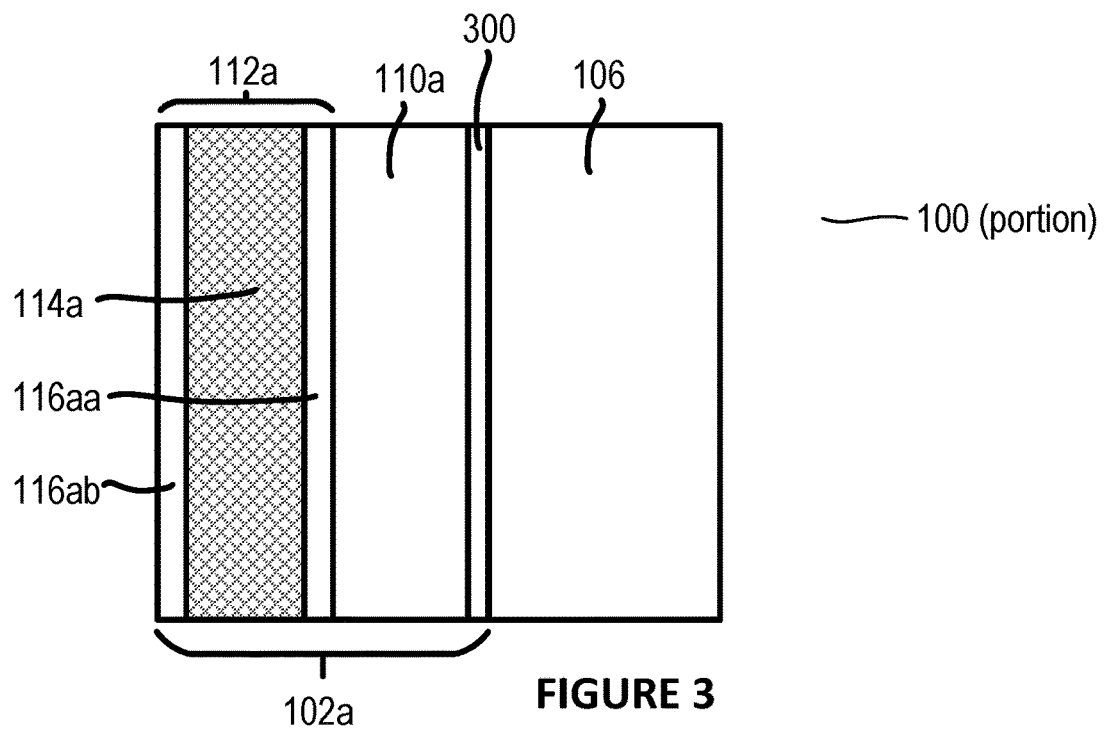
FIG. 3 illustrates a magnified cross-sectional view of a portion of the membrane electrode assembly of FIG. 1, according to certain embodiments.

FIG. 3 illustrates a magnified cross-sectional view of a portion of membrane electrode assembly 100 of FIG. 1, according to certain embodiments. In particular, the magnified view of FIG. 3 includes a portion of electrode 102a and a portion of electrolyte membrane layer 106.

As shown in FIG. 3, a bonding material 300 may be positioned between electrolyte membrane layer 106 and electrode catalyst layer 110a to facilitate adhesion between electrolyte membrane layer 106 and electrode catalyst layer 110a, such as when some or all of the components of membrane electrode assembly 100 are pressed or otherwise coupled together to form a portion or all of membrane electrode assembly 100. A similar bonding material 300 may be present between electrolyte membrane layer 106 and electrode catalyst layer 110b (of FIG. 1). In certain embodiments, bonding material 300 is a liquid ionomer, but bonding material 300 may including any suitable material. As just one particular example, and depending on the content of electrolyte membrane layer 106, bonding material 300 may be a fluoropolymer such as a proton exchange membrane like NAFION manufactured by DUPONT, a bipolar exchange membrane like FUMASEP manufactured by FUMATECH BWT GMBH, or an anion exchange membrane like TOKUYAMA A201 manufactured by TOKUYAMA CORPORATION or AEMION manufactured by IONOMR INNOVATIONS INC.

Figure 4A:
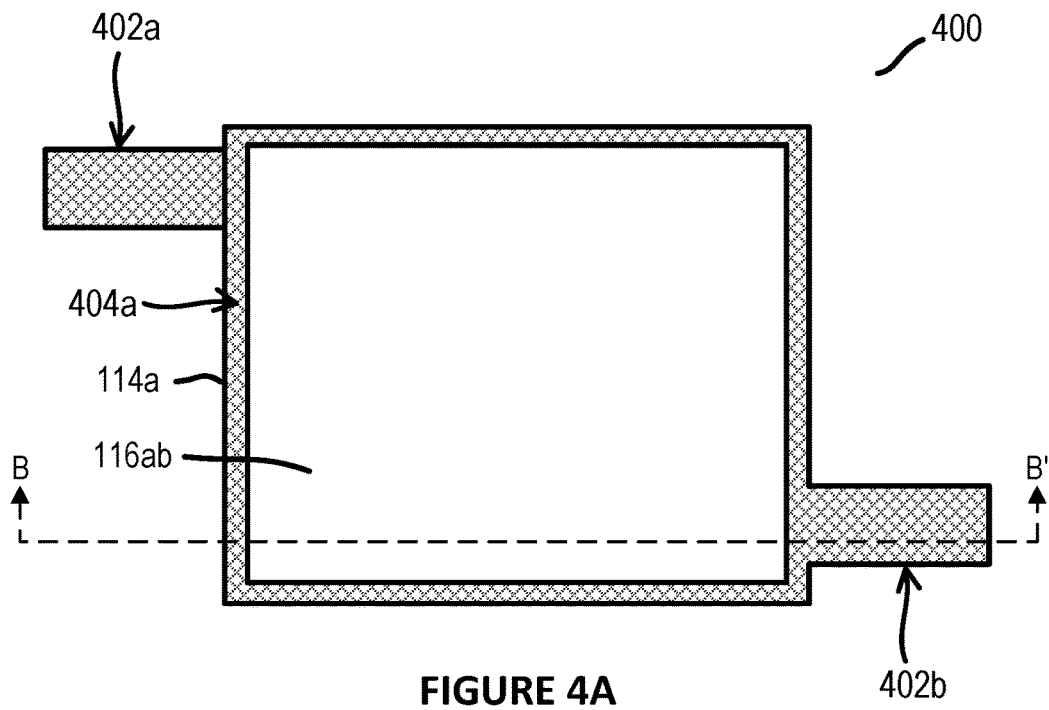
FIGS. 4A-4B illustrate plan and cross-sectional views, respectively, of an example membrane electrode assembly, according to certain embodiments.
Figure 4B:
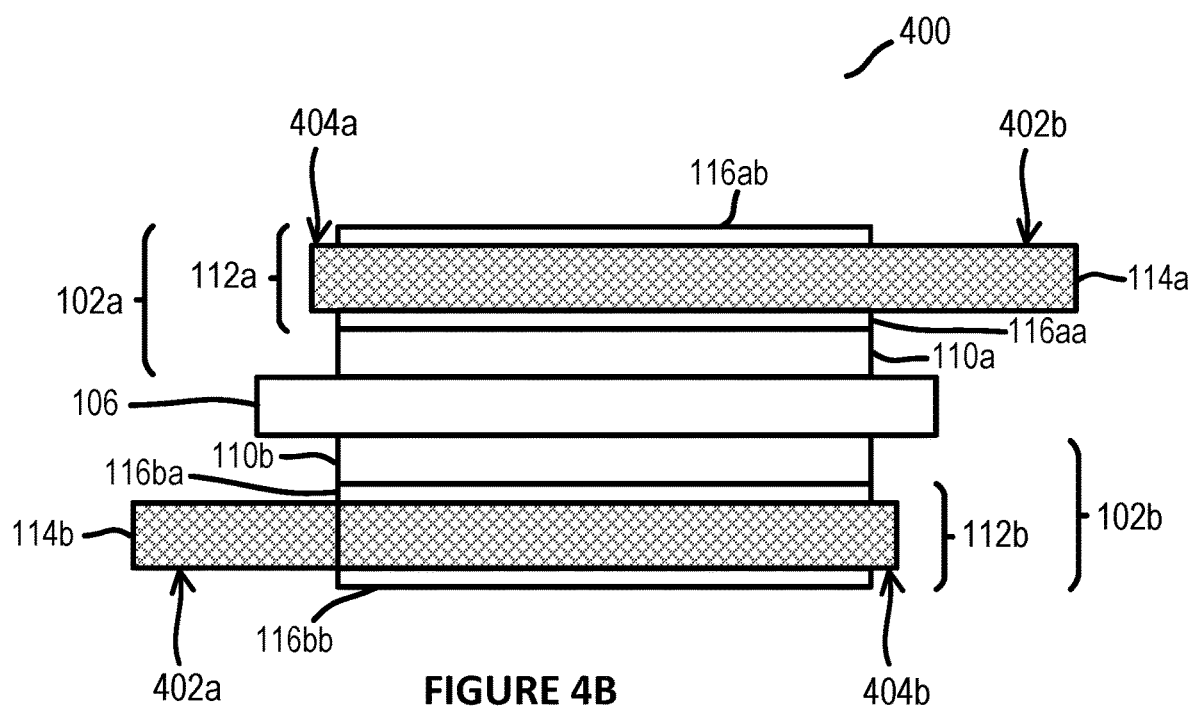

FIGS. 4A-4B illustrate plan and cross-sectional views, respectively, of an example membrane electrode assembly 400, according to certain embodiments. Membrane electrode assembly 400 may be a particular implementation of membrane electrode assembly 100 of FIG. 1. Thus, the same reference numerals used to refer to aspects of membrane electrode assembly 100 are used to refer to aspects of membrane electrode assembly 400. The cross-sectional view of FIG. 4B is taken along a cross-section B-B' of FIG. 4A.

With reference to both FIGS. 4A and 4B, a coating 116ab of porous material is deposited on a surface of metal-containing layer 114a of metallic gas diffusion layer 112a that faces away from electrolyte membrane layer 106 and electrode catalyst layer 110a. Additionally, as best seen in FIG. 4B, a coating 116bb of porous material is deposited on a surface of metal-containing layer 114b of metallic gas diffusion layer 112b that faces away from electrolyte membrane layer 106 and electrode catalyst layer 110b. In this example, a portion 404a of metal-containing layer 114a remains uncovered by porous material of coatings 116aa and 116ab. Portion 404a extends around a perimeter of metal-containing layer 114a. Additionally, as best seen in FIG. 4B, a portion 404b of metal-containing layer 114b remains uncovered by porous material of coatings 116ba and 116bb. Portion 404b extends around a perimeter of metal-containing layer 114b. When depositing coatings 116 of porous material on metal-containing layers 114a and 114b, a template (e.g., similar to a stencil) may be used to control the areas on which coatings 116 are deposited such that portions 404 of metal-containing layers 114 remain uncovered by coatings 116.

Metal-containing layers 114 of metallic gas diffusion layers 112 include respective tabs 402. For example, metal-containing layer 114a of metallic gas diffusion layer 112a includes tab 402a, and metal-containing layer 114b of metallic gas diffusion layer 112b includes tab 402b. Tabs 402 may be used to contact another element of a fuel cell or other apparatus for carrying current and powering a device. In certain embodiments, tabs 402 may be used for carrying current in place of separate current collector plates for membrane electrode assembly 400. Thus, tabs 402a and 402b may be configured to electrically connect, directly or indirectly, to respective terminals of a fuel cell, each terminal having an associated polarity, the polarity of the terminals being opposite one another.

Tabs 402 may have any suitable size and shape, according to particular implementations. Additionally, although tabs 402a and 402b are shown to extend from opposite sides of membrane electrode assembly 400, tabs 402a and 402b may extend from any particular side of membrane electrode assembly 400, and may extend from the same or different sides of membrane electrode assembly 400.

Although this disclosure contemplates using membrane electrode assembly 400 in any suitable context, in certain embodiments, membrane electrode assembly 400 may be suitable for relatively low power (e.g., in the hundreds of watts) fuel cells/fuel cell stacks. In certain embodiments, metal-containing layers 114 of membrane electrode assembly 400 may be made from composite plates, which may reduce overall weight, though at the possible expense of losing some conductivity. Such composite plates could include, for example, a graphite composite material.

Figure 5A:
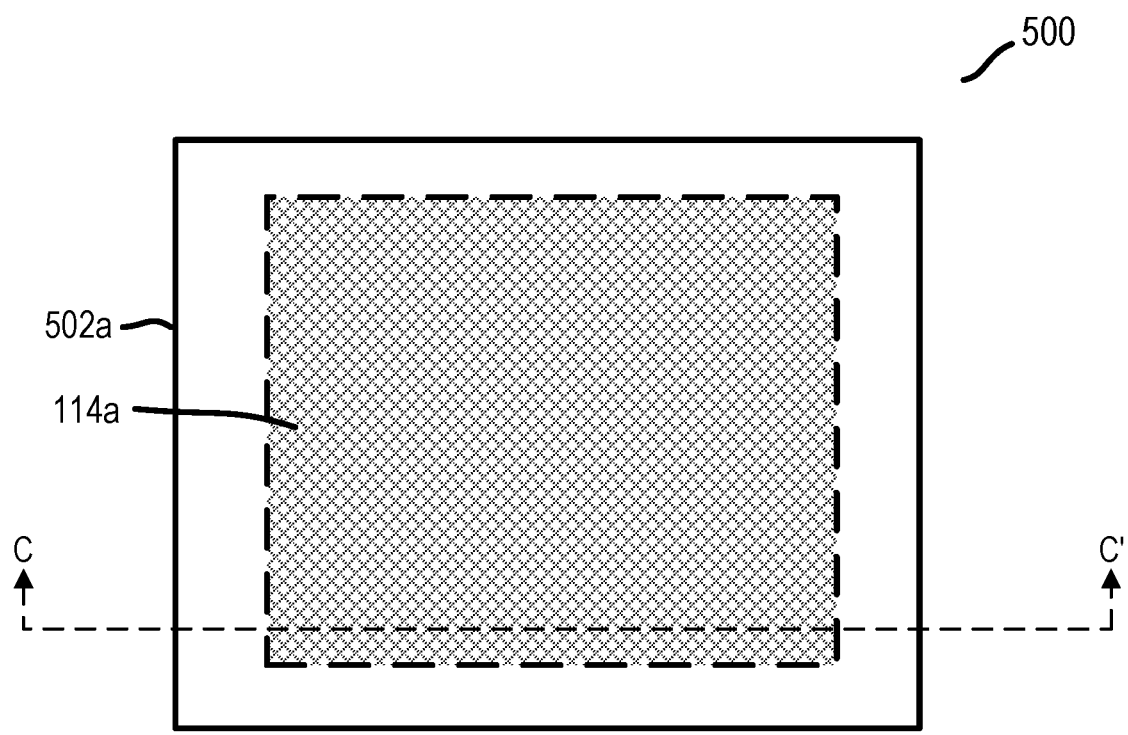
FIGS. 5A-5B illustrate plan and cross-sectional views, respectively, of an example membrane electrode assembly, according to certain embodiments.
Figure 5B:
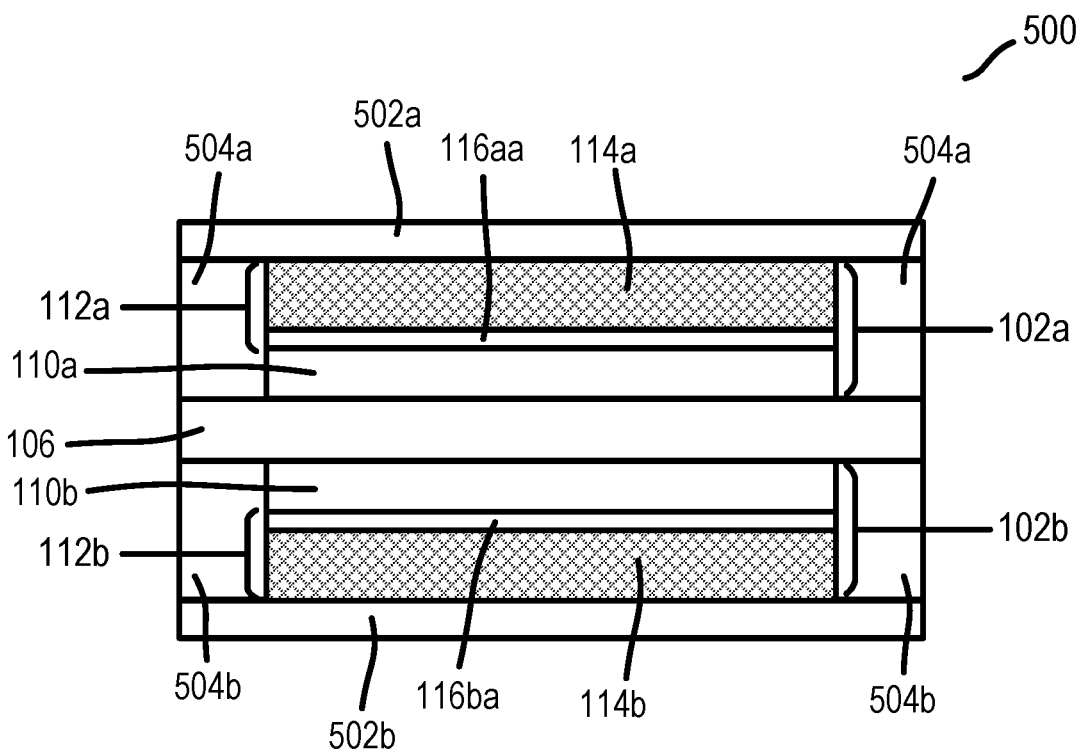

FIGS. 5A-5B illustrate plan and cross-sectional views, respectively, of an example membrane electrode assembly 500, according to certain embodiments. Membrane electrode assembly 500 may be a particular implementation of membrane electrode assembly 100 of FIG. 1. Thus, the same reference numerals used to refer to aspects of membrane electrode assembly 100 are used to refer to aspects of membrane electrode assembly 500. The cross-sectional view of FIG. 5B is taken along a cross-section C-C' of FIG. 5A.

With reference to both FIGS. 5A and 5B, elements of membrane electrode assembly 500 is positioned between a pair of current collectors 502a (on the side of electrode 102a) and 502b (on the side of electrode 102b). Current collector 502a overlies (at least in the orientation shown) metallic gas diffusion layer 112a. A perimeter of metal-containing layer 114a of metallic gas diffusion layer 112a is shown with dotted line segments in FIG. 5A to illustrate that metal-containing layer 114a underlies (at least in the orientation shown) current collector 502a but to still provide some orientation to the additional features underlying current collector 502a that can be seen in the cross-sectional view of FIG. 5B. Current collector 502b underlies (at least in the orientation shown) metallic gas diffusion layer 112b.

Current collectors 502 are formed of conductive material to facilitate movement of current or electrons to and from membrane electrode assembly 500 such that a device can be powered, wholly or partially, by a fuel cell that incorporates membrane electrode assembly 500. For example, current collector 502a may carry negatively-charged electrons from electrode 102a and current collector 502b may return negatively-charged electrons to electrode 102b. Thus, current collectors 502a and 502b may be configured to electrically connect, directly or indirectly, to respective terminals of a fuel cell, each terminal having an associated polarity, the polarity of the terminals being opposite one another.

Current collectors 502 may be formed of any suitable type of conductive material. For example, conductive material of current collectors 502 may include copper, aluminum, gold, a metallic alloy, or another conductive material. In certain embodiments, the type of conductive material for a current collector 502 may depend on a type of electrode 102 (e.g., anode or cathode) and/or on a type of fuel cell into which membrane electrode assembly 500 is being incorporated. That is, in certain embodiments, a current collector 502a for an anode (e.g., electrode 102a) may include a different conductive material than a current collector 502b for a cathode (e.g., electrode 102b).

In the illustrated example, a pair of gaskets 504 may be used to seal certain components of membrane electrode assembly 500 between, in this example, current collectors 502. For example, a gasket 504a may surround electrode 102a along a perimeter of electrode 102a and be sandwiched between current collector 502a and electrolyte membrane layer 106 to provide a seal for electrode 102a. As another example, a gasket 504b may surround electrode 102b along a perimeter of electrode 102b and be sandwiched between current collector 502b and electrolyte membrane layer 106 to provide a seal for electrode 102b. Although described as gaskets, any suitable sealant mechanism may be used in place of gaskets 504. In one example, gaskets 504 are made of silicone rubber.

In example membrane electrode assembly 500, no second coating 116 (e.g., second coating 116ab or 116bb) has been deposited on surfaces of metal-containing layers 114a and 114b that face away from electrode catalyst layers 110. This disclosure, however, contemplates membrane electrode assembly 500 being implemented with a second coating 116 (e.g., second coating 116ab or 116bb) being deposited on surfaces of metal-containing layers 114a and 114b that face away from electrode catalyst layers 110, such that the second coatings 116 are positioned between current collectors 502 and metal-containing layers 114.

Figure 6:
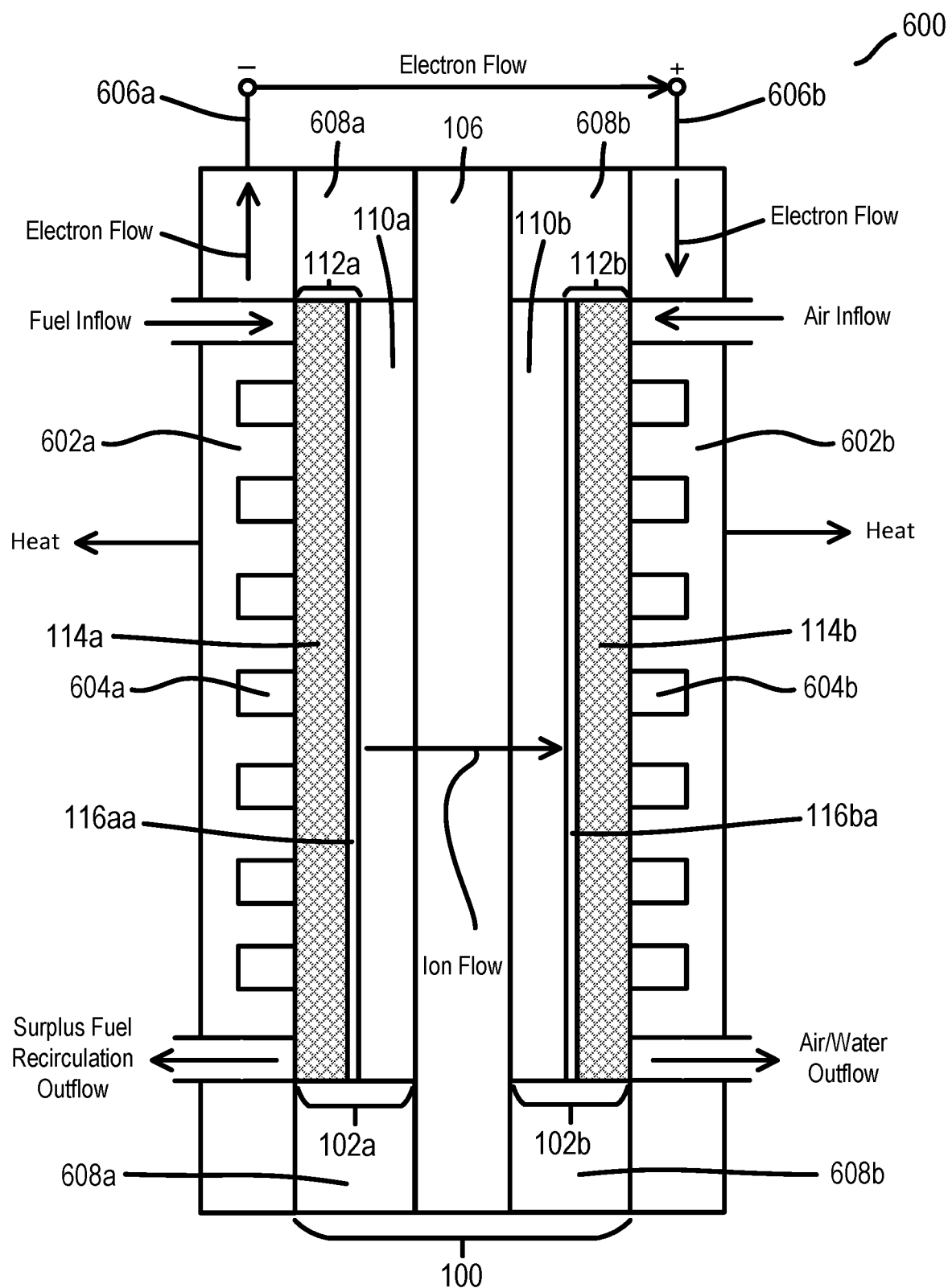
FIG. 6 illustrates an example fuel cell that incorporates the example membrane electrode assembly of FIG. 1, according to certain embodiments.

FIG. 6 illustrates an example fuel cell 600 that incorporates membrane electrode assembly 100 of FIG. 1, according to certain embodiments. Fuel cell 600 may be a complete power source (or at least a portion of a complete power source) or a fuel cell that is part of a larger collection of fuel cells (e.g., a stack of fuel cells) that collectively form a power source, for example. In the illustrated example, fuel cell 600 includes membrane electrode assembly 100, which includes electrode 102a (e.g., an anode) and electrode 102b (e.g., a cathode). Although electrode 102a and electrode 102b are primarily described as an anode and a cathode, respectively, this disclosure contemplates the polarity being reversed, if appropriate. Membrane electrode assembly 100, including some or all of its constituent parts, may be constructed using techniques described throughout this disclosure.

As shown in FIG. 6, electrolyte membrane layer 106 separates and electrically insulates electrode 102a from electrode 102b, which are disposed to opposing sides of electrolyte membrane layer 106. Additionally, electrolyte membrane layer 106 provides ion exchange (positive ions or anions, depending on the implementation of fuel cell 600) between electrode 102a and electrode 102b.

Fuel cell 600 includes a pair of bipolar end plates 602a and 602b, which may be referred to generally as end plates 602. In certain embodiments, end plates 602 encase components of fuel cell 600, and may be provided to protect and insulate the internal components of fuel cell 600 (including, for example, membrane electrode assembly 100). A portion of end plates 602 may act as a current collector for collecting and transferring current generated using membrane electrode assembly 100. Although primarily described as being part of end plates 602, the current collectors could be provided as separate elements of fuel cell 600. Additionally, end plates 602 each include a flow field 604 (flow field 604a for end plate 602a and flow field 604b for end plate 602b), which may be openings that provide a path for movement of fuel, air, water, or other suitable substances used or generated by fuel cell 600. Flow fields 604 also may be referred to as flow channels.

In the illustrated example, end plates 602a and 602b (e.g., such as the respective current collector elements of end plates 602a and 602b) include or are coupled to respective terminals 606a and 606b. For example, end plate 602a, which in this example is associated with electrode 102a (e.g., an anode), may be coupled to a terminal 606a having a first polarity (e.g., a negative polarity). As another example, end plate 602b, which in this example is associated with electrode 102b (e.g., a cathode), may be coupled to a terminal 606b having a second polarity (e.g., a positive polarity) that is opposite the polarity of terminal 606a. Thus, end plates 602a and 602b (and their associated current collectors) may be configured to electrically connect, directly or indirectly, to respective terminals 606a and 606b of fuel cell 600, each terminal 606a and 606b having an associated polarity, the polarity of terminals 606a and 606b being opposite one another. Although terminal 606a and terminal 606b are primarily described as a negative terminal and a positive terminal, respectively, this disclosure contemplates the polarity being reversed, if appropriate.

Although described as terminals, terminals 606a and 606b could be any suitable type of contact portion that could be coupled directly or via any suitable intervening conductive structure, to terminals of fuel cell 600 or a collection of fuel cells of which fuel cell 600 is a part. Furthermore, although terminals 606a and 606b are shown to extend from a same end of fuel cell 600, terminals 606a could extend from fuel cell 600 in a first direction, while terminal 606b could extend from fuel cell 600 in a different (and not necessarily opposite) direction.

End plate 602a may include a fuel inflow opening through which a fuel (e.g., hydrogen, ethanol, etc.) may be injected into fuel cell 600 for processing, at least initially, by electrode 102a. As illustrated, end plate 602a also may include an outflow opening. Surplus fuel may be recirculated to the fuel inflow opening of end plate 602a, if desired. Additionally or alternatively, other reaction byproducts may be output through the outflow opening of end plate 602a. In certain embodiments, flow field 604a provides a flow path between the inflow opening and the outflow opening of end plate 602a.

End plate 602b may include an inflow opening through which air or another suitable substance may be injected into fuel cell 600 for processing, at least initially, by electrode 102b. As illustrated, end plate 602b also may include an outflow opening. Air, water, and/or other reactant byproducts may be expelled from fuel cell 600 through the outflow opening of end plate 602b, if desired. In certain embodiments, flow field 604b provides a flow path between the inflow opening and the outflow opening of end plate 602b.

In the illustrated example, a pair of gaskets 608 may be used to seal certain components of membrane electrode assembly 100 between, in this example, end plates 602. For example, a gasket 608a may surround electrode 102a along a perimeter of electrode 102a and be sandwiched between end plate 602a and electrolyte membrane layer 106 to provide a seal for electrode 102a. As another example, a gasket 608b may surround electrode 102b along a perimeter of electrode 102b and be sandwiched between end plate 602b and electrolyte membrane layer 106 to provide a seal for electrode 102b. Although described as gaskets, any suitable sealant mechanism may be used in place of gaskets 608. In one example, gaskets 608 are made of silicone rubber. Gaskets 608 may be similar to gaskets 504 described above with reference to membrane electrode assembly 500.

End plates 602 may be formed of any suitable material. To the extent end plates 602 play a role in conductive features of fuel cell 600, at least a portion of end plates 602 are made of a conductive material. For example, to the extent end plates 602 incorporate a current collector, the above discussion of example materials for current collectors 502 of membrane electrode assembly 500 (described with reference to FIG. 5) is incorporated by reference. As just a few particular examples, end plates 602 could be made wholly or partially of graphite or metal, such as stainless steel, aluminum, titanium, or the like. Additionally, end plates 602 may have any suitable size and shape.

In addition to end plates 602, fuel cell 600 may include additional casing components to further encase the illustrated elements of fuel cell 600. The additional casing components may encase components of fuel cell 600, and may be provided to protect and insulate the internal components of fuel cell 600 (including, for example, membrane electrode assembly 100). Additionally or alternatively, when fuel cell 600 is part of a collection of fuel cells, the collection of fuel cells may be encased with a suitable casing. Additionally or alternatively, when fuel cell 600 is part of a collection of fuel cells, the current collector of fuel cell 600 (and potentially the other fuel cells of the collection of fuel cells) may be connected to one or more current aggregation elements (e.g., a shared conductive bus bar for the anodes and a shared conductive bus bar for the cathodes). Terminals 606a and 606b may be positioned, at least partially, external to the additional casing and/or may be at least partially integral to the additional casing. The additional casing, to the extent included, may be formed of an insulating material, polymer, shrink wrap, or the like, and may be hard or soft, and which is appropriate may depend on a form factor of fuel cell 600. It should be understood that fuel cell 600 and any additional casing into which fuel cell 600 is incorporated may take any suitable form factor.

In operation of an example embodiment of fuel cell 600, end plate 602a receives a fuel at the fuel inflow, and the fuel passes along an interface of metallic gas diffusion layer 112a of electrode 102a. A fuel for fuel cell 600 may include hydrogen, ethanol, or a variety of other possible fuels. A portion of the fuel that is not processed by metallic gas diffusion layer 112a may be recirculated at a recirculation outflow.

On the anode side, metallic gas diffusion layer 112a (possibly also including a second coating 116ab of porous material) may facilitate distribution of the fuel (e.g., hydrogen gas) along an interface of metallic gas diffusion layer 112a and electrode catalyst layer 110a. Electrode catalyst layer 110a may facilitate a reaction to occur (e.g., an oxidation reaction) in which some or all of the fuel is separated into electrons and positively-charged ions. Metallic gas diffusion layer 112a may facilitate movement of the electrons to a terminal (e.g., an anode terminal 606a), directly or indirectly, and possibly via a current collector, for use in powering a device. Electrode catalyst layer 110a, electrolyte membrane layer 106, and electrode catalyst layer 110*b* are configured to conduct the positively-charged ions (or anions, as may be the case for particular implementations) such that the positively-charged ions (or anions, as may be the case for particular implementations) travel across electrolyte membrane layer 106 from electrode 102*a* to electrode 102*b*.

On the cathode side, the electrons reenter the fuel cell through another terminal (e.g., a cathode terminal 606*b*) and are returned to metallic gas diffusion layer 112*b* of electrode 102*b*, directly or indirectly, and possibly via a current collector. Metallic gas diffusion layer 112*b* may assist in transporting the electrons and a reactant gas to electrode catalyst layer 110*b*, which facilitates a reaction involving the electrons, the positively-charged ions (or anions, as may be the case for particular implementations), and the reactant gas to form a byproduct, such as water. In certain embodiments, the reactant gas may be oxygen, which may be continuously provided through an inflow of air.

FIGS. 7A-7F illustrate an example process 700 for forming a membrane electrode assembly, according to certain embodiments. For example, process 700 may be used to form membrane electrode assembly 100, membrane electrode assembly 400, or membrane electrode assembly 500.

Figure 7A:
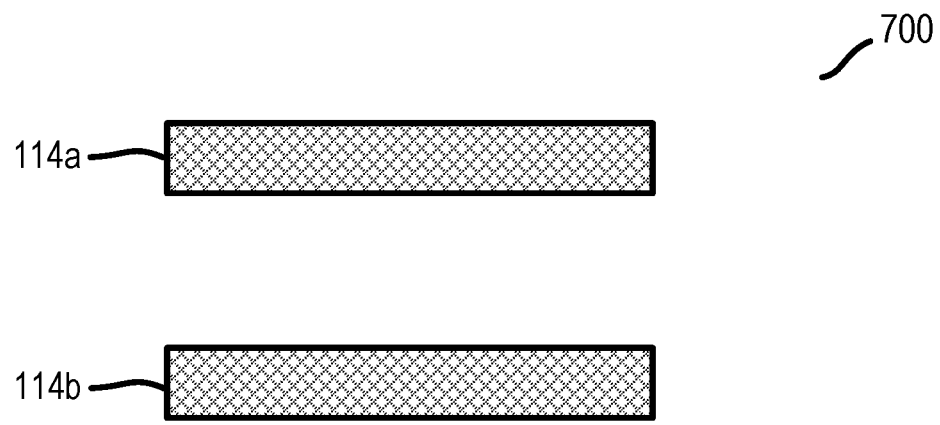
FIGS. 7A-7F illustrate an example process for forming a membrane electrode assembly, according to certain embodiments.

As shown in FIG. 7A, metal-containing layers 114*a* and 114*b* are provided. For purposes of this example, it will be assumed that metal-containing layer 114*a* is being formed into an anode (e.g., electrode 102*a*) and that metal-containing layer 114*b* is being formed into a cathode (e.g., electrode 102*b*). If appropriate, metal-containing layers 114 may be cut into the desired size and shape prior to further processing (or may come in the desired size and shape), or may be cut into the desired size and shape at a subsequent processing stage.

Metal-containing layers 114*a* and 114*b* may be prepared for further processing. In certain embodiments, preparing metal-containing layers 114*a* and 114*b* includes cleaning metal-containing layers 114*a* and 114*b*. For example, metal-containing layers 114*a* and 114*b* may be washed in acid or another suitable substance to reduce or eliminate surface oxides and/or other impurities. Example acids include hydrochloric acid and sulfuric acid. Following the wash, metal-containing layers 114*a* and 114*b* may be rinsed in deionized water or another suitable substance to reduce or eliminate acid and salts. Rinsing may reduce the opportunity for the acid or removed materials to leach into the catalyst layer in a subsequent step. After rinsing, metal-containing layers 114*a* and 114*b* may be dried, such as through baking in an oven. As just one example, the oven may be a muffle furnace.

Figure 7B:
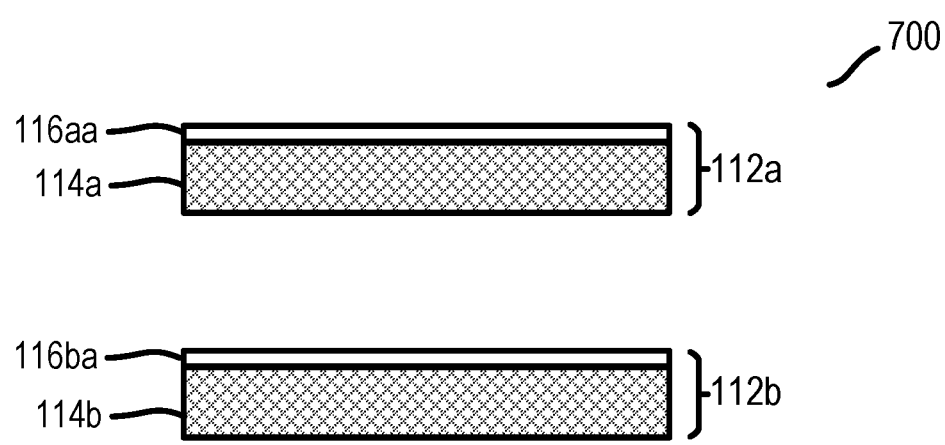

As shown in FIG. 7B, a first coating 116*aa* of porous material may be applied to a first surface of metal-containing layer 114*a* and a first coating 116*ba* of porous material may be applied to a first surface of metal-containing layer 114*b*. In one example, the surfaces of metal-containing layers 114*a* and 114*b* to which the first coatings 116*aa* and 116*ba* are respectively applied are the surfaces that ultimately will face respective electrode catalyst layers 110*a* and 110*b*. In certain embodiments, the combination of metal-containing layer 114*a* and first coating 116*aa* of porous material forms metallic gas diffusion layer 112*a*, which is to be part of electrode 102*a*, and the combination of metal-containing layer 114*b* and first coating 116*ba* of porous material forms metallic gas diffusion layer 112*b*, which is to be part of electrode 102*b*.

In certain embodiments, applying first coating 116*aa* of porous material to the first surface of metal-containing layer 114*a* includes heating metal-containing layer 114*a* and applying a porous layer ink on the first surface of metal-containing layer 114*a* to form first coating 116*aa* of porous material. Similarly, applying first coating 116*ba* of porous material to the first surface of metal-containing layer 114*b* may include heating metal-containing layer 114*b* and applying a porous layer ink on the first surface of metal-containing layer 114*b* to form first coating 116*ba* of porous material.

For example, each metal-containing layer 114*a* and 114*b* may be positioned on a hot plate or other heating apparatus and heated to suitable temperature. In certain embodiments, first coatings 116*aa* and 116*ba* are applied to the heated metal-containing layers 114*a* and 114*b* by spraying, using an air-brush, in substantially uniform strokes, the porous material to the first surfaces of metal-containing layers 114*a* and 114*b*. For example, the air brush used to apply first coatings 116*aa* and 116*ba* of the porous material to metal-containing layers 114*a* and 114*b* may be a hand-held spray brush or may be part of a machine, such as a slot die coater. Applying first coatings 116*aa* and 116*ba* while metal-containing layers 114*a* and 114*b* are at an elevated temperature may facilitate applying a uniform smooth coating of porous material to metal-containing layers 114*a* and 114*b*.

In certain embodiments, the porous material of coatings 116*aa* and 116*ba* is formed using a porous ink that is a slurry formed from a powder, a hydrophobic binder, and (during deposition) a solvent.

As just one particular example, the powder may include a carbon powder (e.g., a high surface area carbon black or activated carbon of various forms). Examples of carbon powders are BLACK PEARLS currently manufactured by CABOT CORPORATION and KETJENBLACK manufactured by AKZO NOBEL N.V.

The binder, or binding agent, may act as an adhesive that helps the porous material rest on the surface to which the porous ink is applied, in this case the first surface of a metal-containing layer 114. In other words, the binder may help hold particles of the powder together to form coatings 116*a* and 116*ba*. As just one example, the binding agent may be a hydrophobic binder and may include PTFE. An example of PTFE is TEFLON currently manufactured by THE CHEMOURS COMPANY. The binding agent may be inert.

In certain embodiments, the powder and hydrophobic binder (and potentially other components of the porous material of coatings 116) are mixed using a solvent. The solvent may liquefy the combination of these components for deposition. Example solvents include dimethyl sulfoxide (DMSO), ethanol, isopropyl alcohol, and the like.

The components of the porous material may contribute to the performance of metallic gas diffusion layer of the membrane electrode assembly being formed. The various ratios of the components relative to one another may be selected to achieve an optimal combination of properties of the metallic gas diffusion layer and associated membrane electrode assembly. Moreover, the selection of solvent may affect which binding agents are suitable, and possibly whether additional additives are appropriate.

Although the porous material is described as including this particular content or taking this particular form or being deposited in particular manners, this disclosure contemplates the porous material including any suitable content and taking any suitable form and being deposited in any suitable manner. For example, although use of a solvent and formation into a slurry is described, the porous material of coatings 116 may be deposited using dry deposition techniques, if desired, and therefore the solvent may be omitted in such embodiments.

Porous material may be applied to the first surfaces of metal-containing layers 114a and 114b until a target loading of porous material is reached. The content (e.g., the porous material) and/or thickness of coatings 116aa and 116ba of porous materials may be the same or different. Although coatings 116aa and 116ba may have any suitable thickness, in certain embodiments, coatings 116aa and 116ba are about 2 μm to about 10 μm thick, potentially depending on the fuel and oxidizer to be used, and on the porosity and density of networks formed, and may have the same or different thicknesses relative to one another. Although coatings 116aa and 116ba may have any suitable area density, in certain embodiments, target areal densities for coatings 116aa and 116ba are about 4 mg/cm$^2$ to about 7 mg/cm$^2$, and may have the same or different areal densities relative to one another.

As described above, applying first coating 116aa of porous material to the first surface of metal-containing layer 114a may include heating metal-containing layer 114a, and applying first coating 116ba of porous material to the first surface of metal-containing layer 114b may include heating metal-containing layer 114b. Heating metal-containing layers 114a and 114b may dry the porous materials of coatings 116aa and 116ba, respectively. In embodiments in which the porous materials of coatings 116aa and 116ba include a solvent, heating metal-containing layers 114a and 114b may include drying, or evaporating, the solvent, which in turn may dry the porous materials of coatings 116aa and 116ba.

The appropriate temperature for heating metal-containing layers 114a and 114b during application of coatings 116aa and 116ba, respectively, of porous material, as well as the time of exposure to the heat, may be specific to the surface area of the surfaces of metal-containing layers 114a and 114b to which coatings 116aa and 116ba, respectively, are being applied. In certain embodiments, the temperature may be about 10° C. to about 30° C. above the boiling point of the solvent in the porous material, and for purposes of drying coatings 116aa and 116ba of porous material, metal-containing layers 114a and 114b may be heated for about 20 minutes to about 40 minutes. In certain embodiments, the suitable temperature is about 50° C. to about 100° C., and in a particular example is about 80° C. It should be understood, however, that the particular temperature may depend on the materials involved and a variety of other factors.

At this state, the combination of metal-containing layer 114a and coating 116aa of porous material on a surface of metal-containing layer 114a to face a subsequently-deposited electrode catalyst material may be considered a metallic gas diffusion layer 112a for an anode (e.g., electrode 102a of membrane electrode assembly 100). Similarly, at this state, the combination of metal-containing layer 114b and coating 116ba of porous material on a surface of metal-containing layer 114b to face a subsequently-deposited electrode catalyst material may be considered a metallic gas diffusion layer 112b for a cathode (e.g., electrode 102b of membrane electrode assembly 100).

Figure 7C:
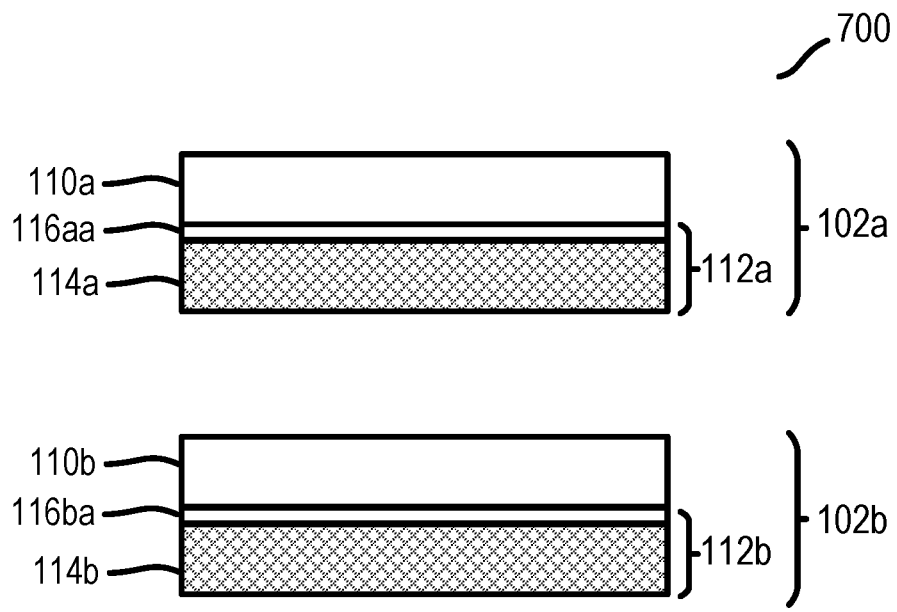

As shown in FIG. 7C, an electrode catalyst layer 110a is deposited on first coating 116aa of porous material of metal-containing layer 114a (e.g., metallic gas diffusion layer 112a), and an electrode catalyst layer 110b is deposited on first coating 116ba of porous material of metal-containing layer 114b (e.g., metallic gas diffusion layer 112b).

In certain embodiments, depositing electrode catalyst layer 110a on first coating 116aa of porous material of metal-containing layer 114a includes heating metal-containing layer 114a and applying a catalyst ink on first coating 116aa. Similarly, depositing electrode catalyst layer 110b on first coating 116ba of porous material of metal-containing layer 114b may include heating metal-containing layer 114b and applying a catalyst ink on first coating 116ba.

For example, each metal-containing layer 114a and 114b may be positioned on a hot plate or other heating apparatus and heated to suitable temperature. In certain embodiments, electrode catalyst layers 110a and 110b are deposited to the heated metal-containing layers 114a and 114b by spraying, using an air-brush, in substantially uniform sweeps, the electrode catalyst material to a surface of first coating 116aa of porous material of metal-containing layer 114a and to a surface of first coating 116ba of porous material of metal-containing layer 114b, and allowing the deposited electrode catalyst material to dry while on the hot plate. For example, the air brush used to apply the catalyst material on first coatings 116aa and 116ba of the porous material may be a hand-held spray brush or may be part of a machine, such as a slot die coater.

In certain embodiments, the electrode catalyst material of electrode catalyst layers 110a and 110b is formed using an electrode catalyst ink that is a slurry formed from a powder, a binder, and (during deposition) a solvent.

For example, the powder may include a powder of a suitable material for the electrode being formed (e.g., anode or cathode) in view of the type of fuel cell being formed. In the case of an anode, the material of electrode catalyst layer 110 may include a catalyst material and an ion-conducting polymer (e.g., an ionomer), and may facilitate the splitting of the fuel (e.g., hydrogen) into protons and electrons. In the case of a cathode, the material of electrode catalyst layer 110 may include a catalyst material and an ion-conducting polymer (e.g., an ionomer), and may facilitate the reduction of the oxygen by reacting with the protons resulting from the splitting of the fuel (e.g., hydrogen) by the anode (and passing through electrolyte membrane layer 106) to produce water or another suitable byproduct.

As particular examples, the catalyst material of electrode catalyst layers 110 may include platinum, platinum alloys with transition metals, platinum-ruthenium alloy, platinum de-alloy, palladium, core-shell, non-precious metal, shape-controlled nanocrystals, extended platinum surfaces, nanoframes, or other materials/structures, and may be in black (or pure) form or a supported form. In supported form, the support material may include carbon or another suitable material. As just a few examples, the catalyst material may be platinum-on-carbon or ruthenium-on-carbon. The ionomer(s) in each electrode catalyst layers 110 may facilitate the movement of protons through electrode catalyst layers 110.

The binder, or binding agent, may act as an adhesive that helps electrode catalyst ink rest on the surface to which the electrode catalyst ink is deposited. In other words, the binder may help hold particles of the powder together to form electrode catalyst layers 110a and 110b. As just one example, and depending at least in part on the polarity of the ion to be conducted across electrode catalyst layer 110, the binding agent may be a fluoropolymer such as a proton exchange membrane like NAFION manufactured by DUPONT, a bipolar exchange membrane like FUMASEP manufactured by FUMATECH BWT GMBH, or an anion exchange membrane like TOKUYAMA A201 manufactured by TOKUYAMA CORPORATION or AEMION manufactured by IONOMR INNOVATIONS INC.

In certain embodiments, the powder and binder (and potentially other components of the electrode catalyst ink of electrode catalyst layers 110) are mixed using a solvent. The solvent may liquefy the combination of these components for deposition. Example solvents include DMSO, ethanol, isopropyl alcohol, and the like.

The components of the electrode catalyst layers 110 may contribute to the performance of electrodes 102, and thereby to the performance of membrane electrode assembly 100. The various ratios of the components relative to one another may be selected to achieve an optimal combination of properties of membrane electrode assembly 100. Moreover, the selection of solvent may affect which binding agents are suitable, and possibly whether additional additives are appropriate.

Although electrode catalyst layers 110 are described as including particular content or taking a particular form or being deposited in particular manners, this disclosure contemplates electrode catalyst layers 110 including any suitable content, taking any suitable form, and being deposited in any suitable manner. For example, although using a solvent and forming a slurry is described, electrode catalyst layers 110 may be deposited using dry deposition techniques, and therefore the solvent may be omitted in such embodiments.

Electrode catalyst ink may be deposited until a target loading for an electrode catalyst layer 110 is achieved. The content and/or thickness of electrode catalyst layers 110 may be the same or different. Although electrode catalyst layers 110a and 110b may have any suitable thickness, in certain embodiments, electrode catalyst layers 110a and 110b are about 2 m to about 8 µm thick, potentially depending on the fuel and oxidizer to be used, and on the porosity and density of networks formed, and may have the same or different thicknesses relative to one another. Although electrode catalyst layers 110 may have any suitable areal density, in certain embodiments, electrode catalyst layers have an areal density of about 4 mg/cm$^2$ to about 8 mg/cm$^2$, and may have the same or different areal densities relative to one another.

As described above, depositing electrode catalyst layer 110a on first coating 116aa of porous material of metal-containing layer 114a may include heating metal-containing layer 114a and depositing electrode catalyst layer 110a on first coating 116aa of porous material, and depositing electrode catalyst layer 110b on first coating 116ba of porous material of metal-containing layer 114b may include heating metal-containing layer 114b and depositing electrode catalyst layer 110b on first coating 116ba of porous material. Heating metal-containing layers 114a and 114b may dry the electrode catalyst inks of electrode catalyst layers 110a and 110b, respectively. In embodiments in which the electrode catalyst inks of electrode catalyst layers 110a and 110b include a solvent, heating metal-containing layers 114a and 114b may include drying, or evaporating, the solvent, which in turn may dry the electrode catalyst inks of electrode catalyst layers 110a and 110b.

The appropriate temperature for heating metal-containing layers 114a and 114b during application of electrode catalyst layers 110a and 110b, respectively, as well as the heat exposure time, may be specific to the surface area of the surfaces of metal-containing layers 114a and 114b to which the electrode catalyst layers 110a and 110b are being applied. In certain embodiments, the temperature may be about 10° C. to about 30° C. above the boiling point of the solvent in the electrode catalyst inks, and for purposes of drying the electrode catalyst inks of electrode catalyst layers 110a and 110b, metal-containing layers 114a and 114b may be heated for about 20 minutes to about 40 minutes. In certain embodiments, the suitable temperature is about 50° C. to about 10° C., and in a particular example is about 80° C. The particular temperature, however, may depend on the materials involved and a variety of other factors.

In certain embodiments, metal-containing layers 114a and 114b may be positioned on a hot plate for the heating associated with depositing and drying of the porous material of coatings 116aa and 116ba, respectively, and then left on the hot plate for depositing and drying of electrode catalyst layers 110a and 110b. In certain embodiments, the porous material of a coating 116aa or 116ba may be allowed to dry prior to depositing and drying electrode catalyst layers 110a and 110b. If applicable, suitable temperature adjustments may be made. For example, the heat may be increased or decreased for depositing the electrode catalyst layers 110a and 110b, if appropriate.

At this state, the combination of metallic gas diffusion layer 112a and electrode catalyst layer 110a may be considered an anode (e.g., electrode 102a of membrane electrode assembly 100). Similarly, at this state, the combination of metallic gas diffusion layer 112b and electrode catalyst layer 110b may be considered a cathode (e.g., electrode 102b of membrane electrode assembly 100).

Figure 7D:
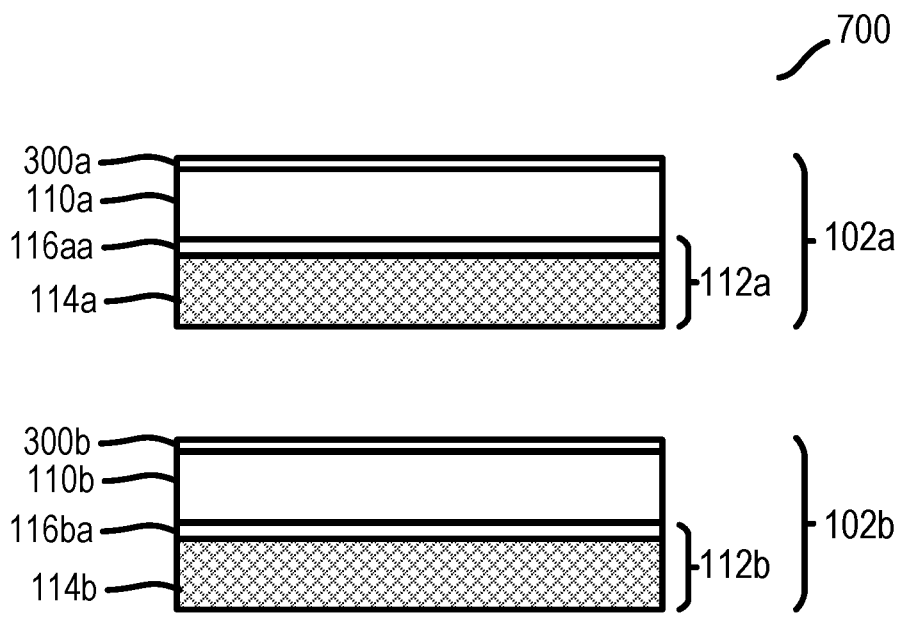

As illustrated in FIG. 7D, in certain embodiments, a bonding material 300a may be deposited on electrode catalyst layer 110a, and a bonding material 300b may be deposited on electrode catalyst layer 110b. Bonding material 300a and 300b may facilitate adhesion between electrolyte membrane layer 106 and electrode catalyst layers 110a and 110b, respectively, such as in a subsequent step when electrodes 102a and 102b and electrolyte membrane layer 106 (shown in subsequent FIGS. 7E-7F) are pressed or otherwise coupled together to form a portion or all of a membrane electrode assembly (e.g., a membrane electrode assembly 100). In certain embodiments, bonding material 300 is a liquid ionomer, but bonding material 300 may including any suitable material. As just one particular example, and depending at least in part on the polarity of the ion to be conducted across electrolyte membrane layer 106, bonding material 300 may be a fluoropolymer such as a proton exchange membrane like NAFION manufactured by DUPONT, a bipolar exchange membrane like FUMASEP manufactured by FUMATECH BWT GMBH, or an anion exchange membrane like TOKUYAMA A201 manufactured by TOKUYAMA CORPORATION or AEMION manufactured by IONOMR INNOVATIONS INC. Bonding material 300a and bonding material 300b may be the same or different, according to particular implementations.

Figure 7E:
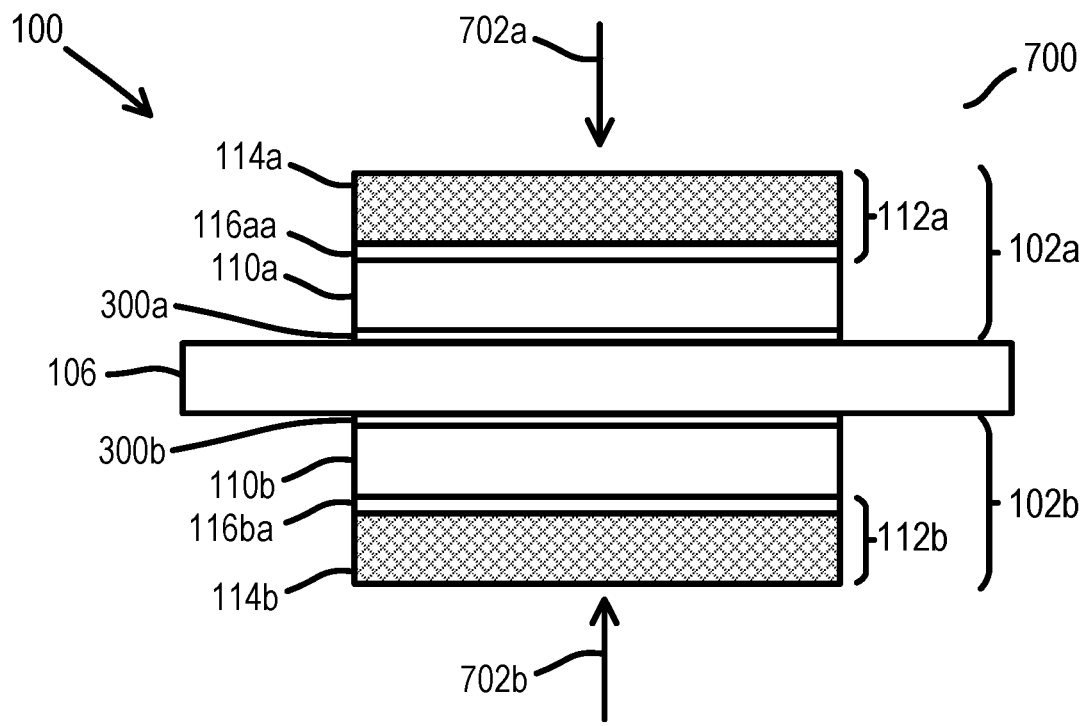

As illustrated in FIG. 7E, metallic gas diffusion layer 112a and electrode catalyst layer 110a are coupled to a first side of electrolyte membrane layer 106 and metallic gas diffusion layer 112b and electrode catalyst layer 110b are coupled to a second side of electrolyte membrane layer 106. For example, with metallic gas diffusion layer 112a and electrode catalyst layer 110a positioned to a first side of electrolyte membrane layer 106 and metallic gas diffusion layer 112b and electrode catalyst layer 110b positioned to a second side of electrolyte membrane layer 106, metallic gas diffusion layer 112a, electrode catalyst layer 110a, electrolyte membrane layer 106, electrode catalyst layer 110b, and metallic gas diffusion layer 112b may be pressed together using a hot press or other suitable pressing tool. The layers may be pressed together (e.g., in directions 702a and 702b) until the layers bond to form a layer stack, the layer stack being membrane electrode assembly 100. This disclosure contemplates coupling the layers using any suitable technique.

As a result, electrode catalyst layer 110a is positioned between metallic gas diffusion layer 112a and electrolyte membrane layer 106 to the first side of electrolyte membrane layer 106 and electrode catalyst layer 110*b* is positioned between metallic gas diffusion layer 112*b* and electrolyte membrane layer 106 to the second side of the electrolyte membrane layer 106. In other words, electrode 102*a* and electrode 102*b* are pressed to opposing sides of electrolyte membrane layer 106, in directions 702*a* and 702*b*, such that electrolyte membrane layer 106 is positioned between electrode 102*a* and electrode 102*b*. This disclosure contemplates any suitable intervening layers.

This disclosure contemplates coupling metallic gas diffusion layer 112*a*, electrode catalyst layer 110*a*, electrolyte membrane layer 106, and metallic gas diffusion layer 112*b*, electrode catalyst layer 110*b* together in any suitable manner. As just one example, metallic gas diffusion layer 112*a*, electrode catalyst layer 110*a*, electrolyte membrane layer 106, and metallic gas diffusion layer 112*b*, electrode catalyst layer 110*b* are coupled together using a hydraulic heat press tool. Plates of the heat press tool used for performing the pressing may made of any suitable material. In certain embodiments, the plates may include PTFE, aluminum, or another suitable material.

In certain embodiments, metallic gas diffusion layer 112*a* and electrode catalyst layer 110*a* (e.g., electrode 102*a*) to a first side of electrolyte membrane layer 106 and metallic gas diffusion layer 112*b* and electrode catalyst layer 110*b* (e.g., electrode 102*b*) to a second side of electrolyte membrane layer 106 are hot-pressed together at using a suitable pressure, at a suitable temperature, and for a suitable time to form membrane electrode assembly 100. As just a few particular examples, the pressure may be about 3 megapascal (mPa) to about 7 mPa (and about 5 mPa in a more particular example), the temperature may be about 90° C. to about 130° C. (and about 110° C. to about 120° C. in a more particular example), and the time may be about 5 minutes to about 15 minutes (and about 10 minutes in a more particular example). In certain embodiments, the temperature for the hot press may be based on the glass transition temperature of the polymer being used for electrolyte membrane layer 106, such as about 25° C. less than the glass transition temperature of the polymer in a particular example. The particular parameters for performing the pressing may depend on a variety of factors, including potentially the tool used to perform the hot pressing, the materials of electrodes 102*a* and 102*b*, the material of electrolyte membrane layer 106, the material of bonding material 300 (if used), and possible other factors.

At this state, and possibly depending on whether second coatings 116*ab* and 116*bb* of porous material are deposited on metal-containing layers 114*a* and 114*b*, respectively (as described below with reference to FIG. 7F), the combination of electrode 102*a*, electrolyte membrane layer 106, and electrode 102*b* may be considered a membrane electrode assembly 100.

Figure 7F:
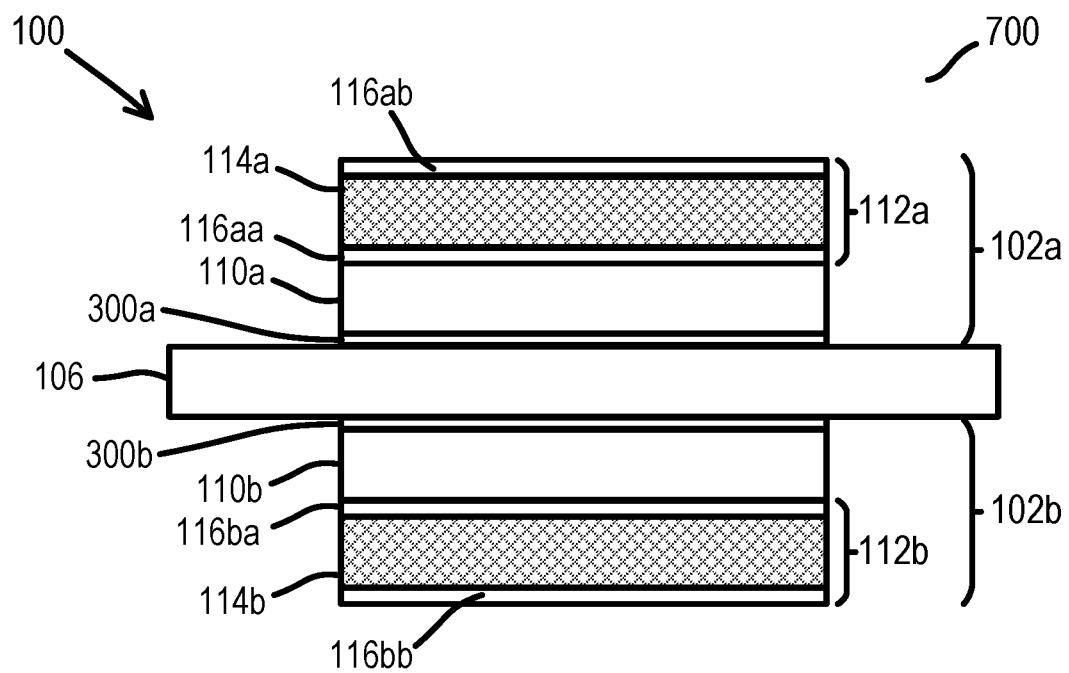

As shown in FIG. 7F, second coatings 116*ab* and 116*bb* of porous material may be deposited on another surface of metal-containing layers 114*a* and 114*b*, respectively, of metallic gas diffusion layers 112*a* and 112*b*. For example, a second coating 116*ab* of porous material may be deposited on a surface of metal-containing layer 114*a* that faces away from electrode catalyst layer 110*a* of electrode 102*a*. As another example, a second coating 116*bb* of porous material may be deposited on a surface of metal-containing layer 114*b* that faces away from electrode catalyst layer 110*b* of electrode 102*b*. Second coatings 116*ab* and 116*bb* of porous material may be deposited in a similar manner to that of first coatings 116*aa* and 116*ba*, as described above with reference to FIG. 7B, the details of which are incorporated by reference. In certain embodiments and for certain applications, adding second coatings 116*ab* and 116*bb* may provide for improved gas transport by metallic gas diffusion layers 112*a* and 112*b*.

To the extent the second coatings 116*ab* and 116*bb* are to be applied over only a portion of the surfaces of metal-containing layers 114*a* and 114*b*, a template (e.g., similar to a stencil) may be used to control the areas on which coatings 116 are deposited such that portions 404 of metal-containing layers 114 remain uncovered by coatings 116 (e.g., portions 404 of metal-containing layers 114, as described above with reference to FIGS. 4A-4B.

FIGS. 8A-8D illustrate an example process 800 for forming a membrane electrode assembly, according to certain embodiments. For example, process 800 may be used to form membrane electrode assembly 100, membrane electrode assembly 400, or membrane electrode assembly 500.

With process 700, described above, electrode catalyst layers 110*a* and 110*b* are combined with metallic gas diffusion layers 112*a* and 112*b*, respectively, prior to being combined with electrolyte membrane layer 106. With process 800, electrode catalyst layers 110*a* and 110*b* are combined with respective opposing surfaces of electrolyte membrane layer 106 prior to combining the resulting combined structure with metallic gas diffusion layers 112*a* and 112*b*. At least portions of process 800 may correspond to a CCM technique. Portions of process 800 may correspond or otherwise be similar to portions of process 700 described above with reference to FIGS. 7A-7F.

Figure 8A:
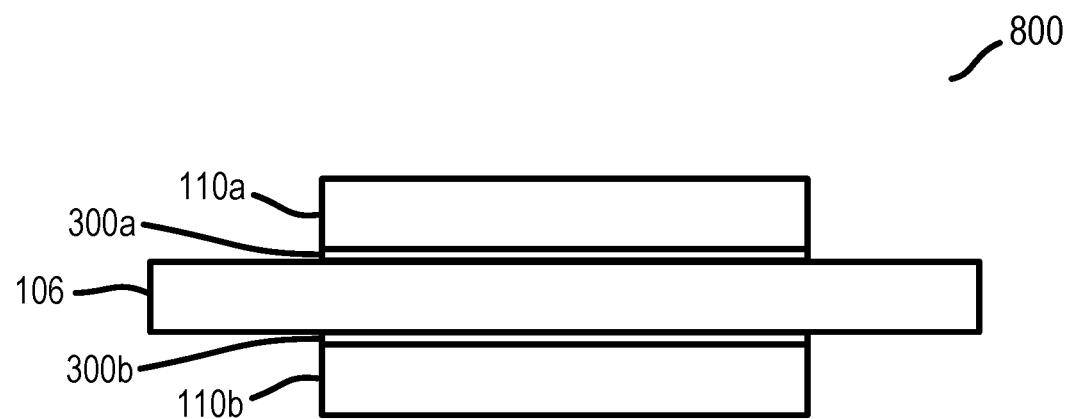
FIGS. 8A-8D illustrate an example process for forming a membrane electrode assembly, according to certain embodiments.

As shown in FIG. 8A, electrode catalyst layers 110*a* and 110*b* are formed on respective opposing surfaces of electrolyte membrane layer 106. In particular, electrode catalyst layer 110*a* is formed on a first surface of electrolyte membrane layer 106, and electrode catalyst layer 110*b* is formed on an opposing second surface of electrolyte membrane layer 106. The combined structure of electrolyte membrane layer 106 and electrode catalyst layers 110*a*/110*b* may be purchased from a suitable supplier or may be formed as part of the process for forming membrane electrode assembly 100.

To the extent the combined structure of electrolyte membrane layer 106 and electrode catalyst layers 110*a*/110*b* is formed as part of process 800 (e.g., rather than purchased as a combined structure), this disclosure contemplates coupling electrode catalyst layers 110*a* and 110*b* to the opposing surfaces of electrolyte membrane layer 106 in any suitable manner.

In certain embodiments, electrode catalyst layers 110*a* and 110*b* may be coupled to the opposing surfaces of electrolyte membrane layer 106 by performing a hot-press technique similar to that described above with reference to FIG. 7E (e.g., in connection with pressing gas diffusion layer 112*a*, electrode catalyst layer 110*a*, electrolyte membrane layer 106, electrode catalyst layer 110*b*, and gas diffusion layer 112*b* together). The description of "coupling" and "pressing" from FIG. 7E is incorporated by reference. In certain embodiments, in a manner similar to that described above with reference to FIG. 7D, bonding material 300*a* may be deposited on electrode catalyst layer 110*a*, and bonding material 300*b* may be deposited on electrode catalyst layer 110*b*. Bonding material 300*a* and 300*b* may facilitate adhesion between electrolyte membrane layer 106 and electrode catalyst layers 110*a* and 110*b*, respectively.

In certain embodiments, electrode catalyst layers 110*a* and 110*b* may be deposited on opposing surfaces of electrolyte membrane layer 106 by performing a deposition technique similar to that described above with reference to FIG. 7C (e.g., in connection with depositing electrode catalyst layer 110a on coating 116aa of porous material on metal-containing layer 114a and depositing electrode catalyst layer 110b on coating 116ba of porous material on metal-containing layer 114b). The description of such depositing from FIG. 7C is incorporated by reference. To the extent electrode catalyst layers 110a and 110b are to cover only a portion of electrolyte membrane layer 106, a template may be used when depositing electrode catalyst layers 110a and 110b on opposing surfaces of electrolyte membrane layer 106 to control the area of deposition.

Figure 8B:
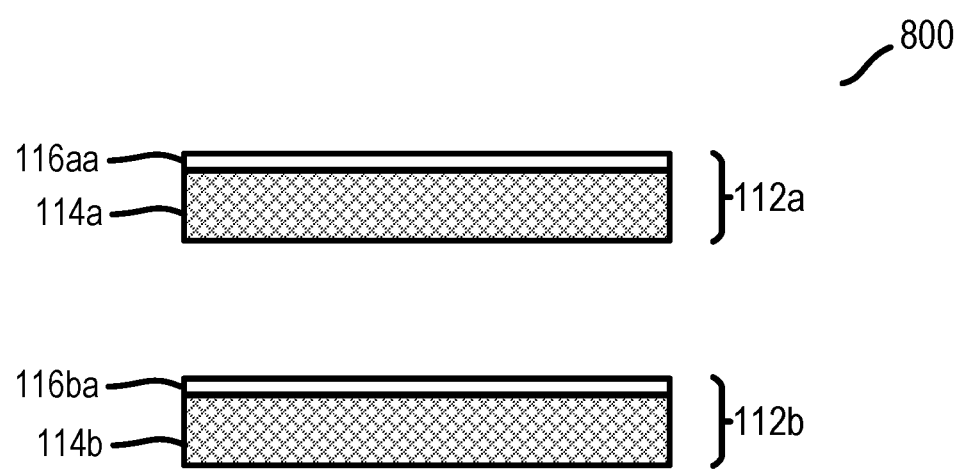

As shown in FIG. 8B, metal-containing layers 114a and 114b are provided, and a first coating 116aa of porous material is applied to a first surface of metal-containing layer 114a and a first coating 116ba of porous material is applied to a first surface of metal-containing layer 114b. The techniques associated with FIG. 8B may be similar to those described in connection with FIGS. 7A-7B. Thus, the description of FIGS. 7A-7B are incorporated by reference.

At this state, the combination of metal-containing layer 114a and coating 116aa of porous material on a surface of metal-containing layer 114a to face an electrode catalyst layer 110a may be considered a metallic gas diffusion layer 112a for an anode (e.g., electrode 102a of membrane electrode assembly 100). Similarly, at this state, the combination of metal-containing layer 114b and coating 116ba of porous material on a surface of metal-containing layer 114b to face an electrode catalyst layer 110b may be considered a metallic gas diffusion layer 112b for a cathode (e.g., electrode 102b of membrane electrode assembly 100).

Figure 8C:
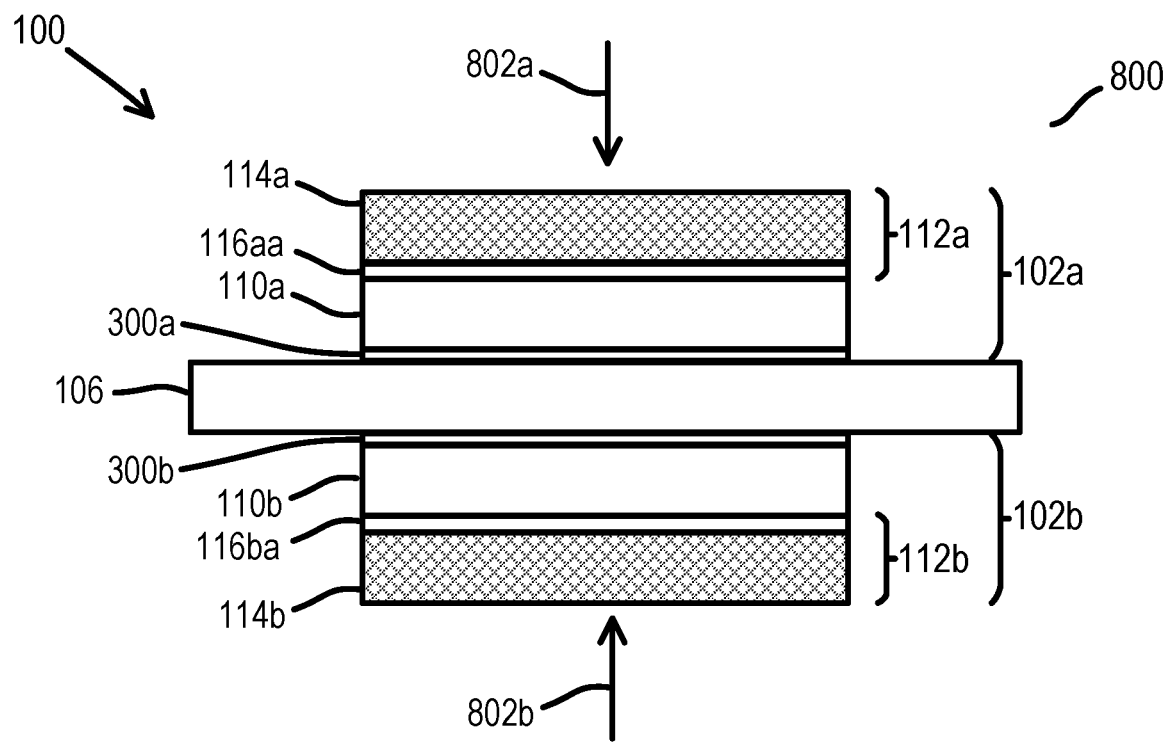

As shown in FIG. 8C, metallic gas diffusion layer 112a is coupled to a first side of the combined structure (e.g., the combined structure including electrode catalyst layer 110a to a first side of electrolyte membrane layer 106 and electrode catalyst layer 110b to a second side of electrolyte membrane layer 106) and metallic gas diffusion layer 112b is coupled to a second side of the combined structure (e.g., the combined structure including electrode catalyst layer 110a to a first side of electrolyte membrane layer 106 and electrode catalyst layer 110b to a second side of electrolyte membrane layer 106). For example, with metallic gas diffusion layer 112a positioned to a first side of the combined structure and metallic gas diffusion layer 112b positioned to a second side of the combined structure, metallic gas diffusion layer 112a, the combined structure, and metallic gas diffusion layer 112b may be pressed together, in directions 802a and 802b, using a hot press or other suitable pressing tool. The layers may be pressed together until the layers bond to form a layer stack, the layer stack being the membrane electrode assembly (e.g., membrane electrode assembly 100). This disclosure contemplates coupling the layers using any suitable technique.

As a result, electrode catalyst layer 110a is positioned between metallic gas diffusion layer 112a and electrolyte membrane layer 106 to the first side of electrolyte membrane layer 106 and electrode catalyst layer 110b is positioned between metallic gas diffusion layer 112b and electrolyte membrane layer 106 to the second side of the electrolyte membrane layer 106.

This disclosure contemplates coupling metallic gas diffusion layer 112a; the combined structure of electrode catalyst layer 110a, electrolyte membrane layer 106, and metallic gas diffusion layer 112b; and electrode catalyst layer 110b together in any suitable manner. In certain embodiments, metallic gas diffusion layer 112a; the combined structure of electrode catalyst layer 110a, electrolyte membrane layer 106, and metallic gas diffusion layer 112b; and electrode catalyst layer 110b may be coupled together by performing a hot-press technique similar to that described above with reference to FIG. 7E (e.g., in connection with pressing gas diffusion layer 112a, electrode catalyst layer 110a, electrolyte membrane layer 106, electrode catalyst layer 110b, and gas diffusion layer 112b together). The description of "coupling" and "pressing" from FIG. 7E is incorporated by reference.

At this state, the combination of metallic gas diffusion layer 112a and electrode catalyst layer 110a may be considered an anode (e.g., electrode 102a of membrane electrode assembly 100). Similarly, at this state, the combination of metallic gas diffusion layer 112b and electrode catalyst layer 110b may be considered a cathode (e.g., electrode 102b of membrane electrode assembly 100). Additionally, at this state, and possibly depending on whether second coatings 116ab and 116bb of porous material are deposited on metal-containing layers 114a and 114b, respectively (as described below with reference to FIG. 8D), the combination of electrode 102a, electrolyte membrane layer 106, and electrode 102b may be considered a membrane electrode assembly 100.

Figure 8D:
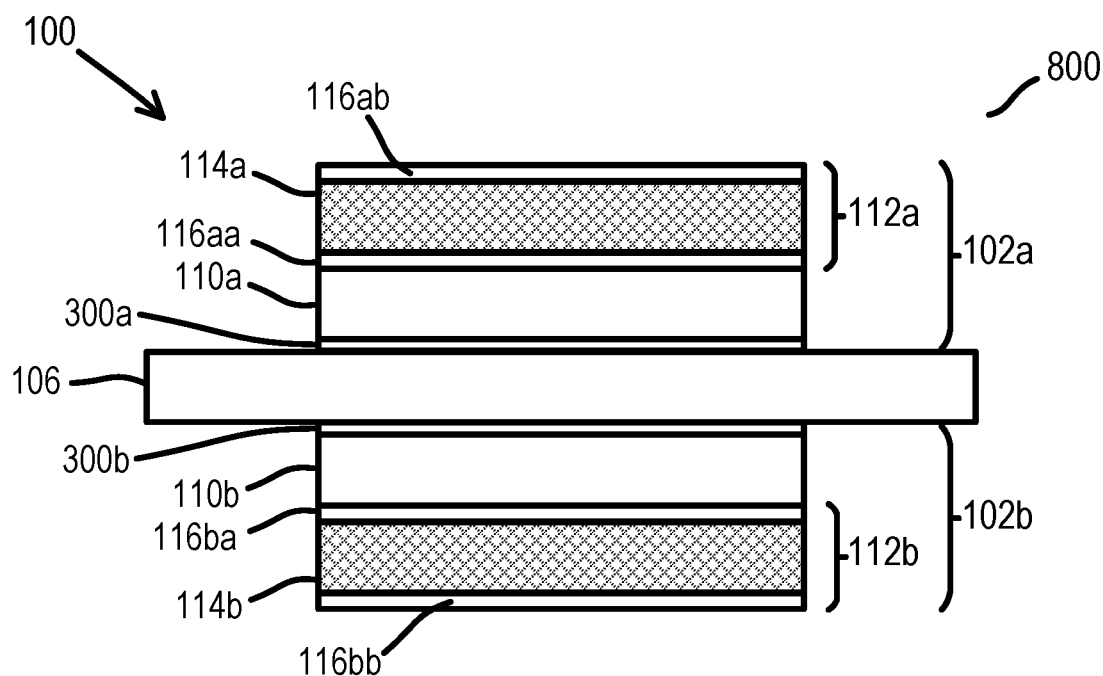

As shown in FIG. 8D, second coatings 116ab and 116bb of porous material may be deposited on another surface of metal-containing layers 114a and 114b, respectively, of metallic gas diffusion layers 112a and 112b. The deposition of second coatings 116ab and 116bb may be performed in a similar manner to that described above with reference to FIG. 7F. Thus, the description of FIG. 7F is incorporated by reference.

With respect to both processes 700 and 800, these techniques are provided as examples only, and this disclosure contemplates using any suitable technique or combination of techniques for depositing, coupling, and otherwise processing electrodes 102a and 102b (and their respective constituent layers) and electrolyte membrane layer 106.

With respect to both processes 700 and 800, although forming single electrodes 102a and 102b (and their respective constituent layers) and electrolyte membrane layer 106 has been referenced, this disclosure contemplates forming electrodes 102 (and/or any of their constituent layers), electrolyte membrane layer 106, and/or membrane electrode assembly 100 having a large enough area to accommodate, forming multiple electrodes 102 (and/or any of their constituent layers), electrolyte membrane layers 106, and/or membrane electrode assemblies 100 in a sheet and then subsequently cutting the formed sheet into separate electrodes 102 (and/or any of their constituent layers), electrolyte membrane layers 106, and/or membrane electrode assemblies 100. Additionally or alternatively, processes 700 and/or 800 may be repeated to form additional membrane electrode assemblies and/or fuel cells.

Figure 9:
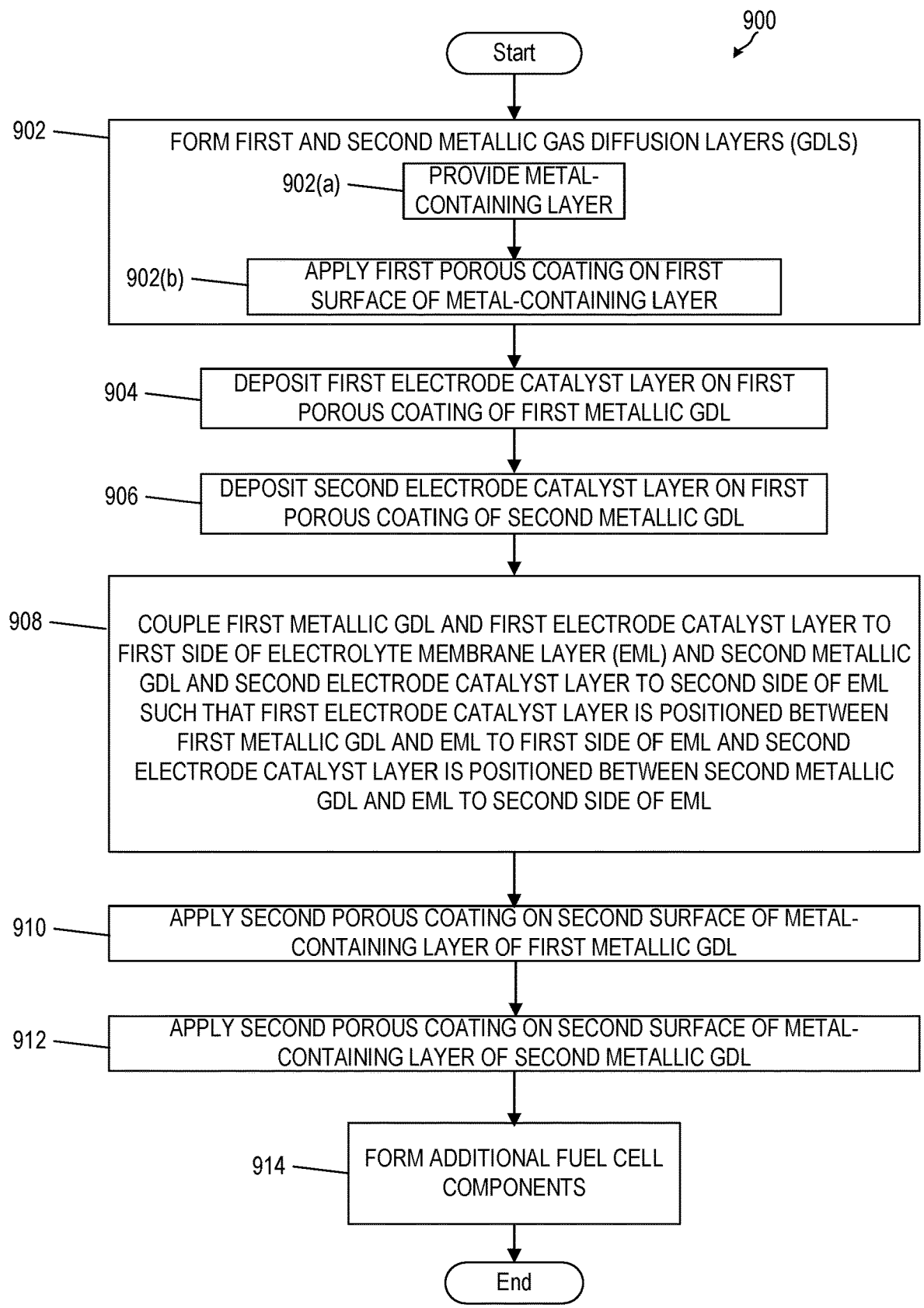
FIG. 9 illustrates an example method for forming a membrane electrode assembly and associated fuel cell, according to certain embodiments.

FIG. 9 illustrates an example method 900 for forming a membrane electrode assembly (e.g., membrane electrode assembly 100) and associated fuel cell, according to certain embodiments. In certain embodiments, method 900 is generally analogous to process 700.

At block 902, first metallic gas diffusion layer 112a and second metallic gas diffusion layer 112b are formed. For each of metallic gas diffusion layers 112a and 112b, block 902 may include, at block 902(a), providing a metal-containing layer 114 (e.g., metal-containing layer 114a or 114b) and, at block 902(b), applying a first coating (first coating 116aa or first coating 116ba) of porous material on a first surface of the metal-containing layer 114. In certain embodiments, for each of metal-containing layers 114a and 114, the metal-containing layer 114a or 114b is prepared prior to applying the first porous coating on the first surface of the metal-containing layer 114a or 114b. Preparing metal-containing layers 114a and 114b may include cleaning metal-containing layers 114a and 114b. For example, metal-containing layers 114a and 114b may be washed in acid or another suitable substance to reduce or eliminate surface oxides and/or other impurities. Following the wash, metal-containing layers 114a and 114b may be rinsed in deionized water or another suitable substance to reduce or eliminate acid and salts. After rinsing, metal-containing layers 114a and 114b may be dried, such as through baking in an oven.

In certain embodiments, block 902 generally corresponds to FIGS. 7A-7B (and associated portions of process 700), the details of which are incorporated by reference. At this state, the combination of metal-containing layer 114a and coating 116aa of porous material on a surface of metal-containing layer 114a to face a subsequently-deposited electrode catalyst layer 110a may be considered a metallic gas diffusion layer 112a for an anode (e.g., electrode 102a). Similarly, at this state, the combination of metal-containing layer 114b and coating 116ba of porous material on a surface of metal-containing layer 114b to face a subsequently-deposited electrode catalyst layer 110b may be considered a metallic gas diffusion layer 112b for a cathode (e.g., electrode 102b).

At block 904, electrode catalyst layer 110a is deposited on first coating 116aa of porous material of metal-containing layer 114a (e.g., metallic gas diffusion layer 112a), and at block 906, electrode catalyst layer 110b is deposited on first coating 116ba of porous material of metal-containing layer 114b (e.g., metallic gas diffusion layer 112b). In certain embodiments, blocks 904 and 906 generally correspond to FIG. 7C (and the associated portions of process 700), the details of which are incorporated by reference.

At block 908, as illustrated in FIG. 7E, metallic gas diffusion layer 112a and electrode catalyst layer 110a (e.g., electrode 102a) are coupled to a first side of electrolyte membrane layer 106 and metallic gas diffusion layer 112b and electrode catalyst layer 110b (e.g., electrode 102b) are coupled to a second side of electrolyte membrane layer 106. For example, with metallic gas diffusion layer 112a and electrode catalyst layer 110a (e.g., collectively, electrode 102a) positioned to a first side of electrolyte membrane layer 106 and metallic gas diffusion layer 112b and electrode catalyst layer 110b (e.g., collectively, electrode 102b) positioned to a second side of electrolyte membrane layer 106, metallic gas diffusion layer 112a, electrode catalyst layer 110a, electrolyte membrane layer 106, electrode catalyst layer 110b, and metallic gas diffusion layer 112b may be pressed together using a hot press or other suitable pressing tool. The layers may be pressed together until the layers bond to form a layer stack, the layer stack being the membrane electrode assembly (e.g., membrane electrode assembly 100). This disclosure contemplates coupling the layers using any suitable technique.

As a result, electrode catalyst layer 110a is positioned between metallic gas diffusion layer 112a and electrolyte membrane layer 106 to the first side of electrolyte membrane layer 106 and electrode catalyst layer 110b is positioned between metallic gas diffusion layer 112b and electrolyte membrane layer 106 to the second side of the electrolyte membrane layer 106. In other words, electrode 102a and electrode 102b are pressed to opposing sides of electrolyte membrane layer 106, in directions 702a and 702b, such that electrolyte membrane layer 106 is positioned between electrode 102a and electrode 102b. In certain embodiments, prior to the pressing together of the layers, a bonding material 300a may be deposited on electrode catalyst layer 110a, and a bonding material 300b may be deposited on electrode catalyst layer 110b. Bonding material 300a and 300b may facilitate adhesion between electrolyte membrane layer 106 and electrode catalyst layers 110a and 110b, respectively, when electrodes 102a and 102b and electrolyte membrane layer 106 are pressed together to form a portion or all of a membrane electrode assembly (e.g., a membrane electrode assembly 100).

In certain embodiments, block 908, as well of the possibility of applying bonding material 300a/300b, generally correspond to FIGS. 7D-7E (and the associated portions of process 700), the details of which are incorporated by reference.

At this state, and possibly depending on whether second coatings 116ab and 116bb of porous material are deposited on metal-containing layers 114a and 114b, respectively (as described below with reference to blocks 910 and 912), the combination of electrode 102a, electrolyte membrane layer 106, and electrode 102b may be considered a membrane electrode assembly 100.

At block 910, a second coating 116ab of porous material is deposited on another surface of metal-containing layer 114a of metallic gas diffusion layer 112a, and at block 912, a second coating 116bb of porous material is deposited on another surface of metal-containing layer 114b of metallic gas diffusion layer 112b. For example, a second coating 116ab of porous material may be deposited on a surface of metal-containing layer 114a that faces away from electrode catalyst layer 110a of electrode 102a. As another example, a second coating 116bb of porous material may be deposited on a surface of metal-containing layer 114b that faces away from electrode catalyst layer 110b of electrode 102b. In certain embodiments, blocks 910 and 912 generally correspond to FIG. 7F (and the associated portions of process 700), the details of which are incorporated by reference.

At block 914, additional fuel cell components may be formed. For example, the membrane electrode assembly formed using method 900 (e.g., membrane electrode assembly 100, membrane electrode assembly 400, or membrane electrode assembly 500) may be assembled with one or more other components to form a fuel cell. For example, the fuel cell may be similar to fuel cell 600, described above with reference to FIG. 6. The one or more other components may include one or more gaskets 608, one or more current collectors, one or more bipolar end plates 602, and/or any other suitable components.

Method 900 may be repeated to form additional membrane electrode assemblies and/or fuel cells.

Figure 10:
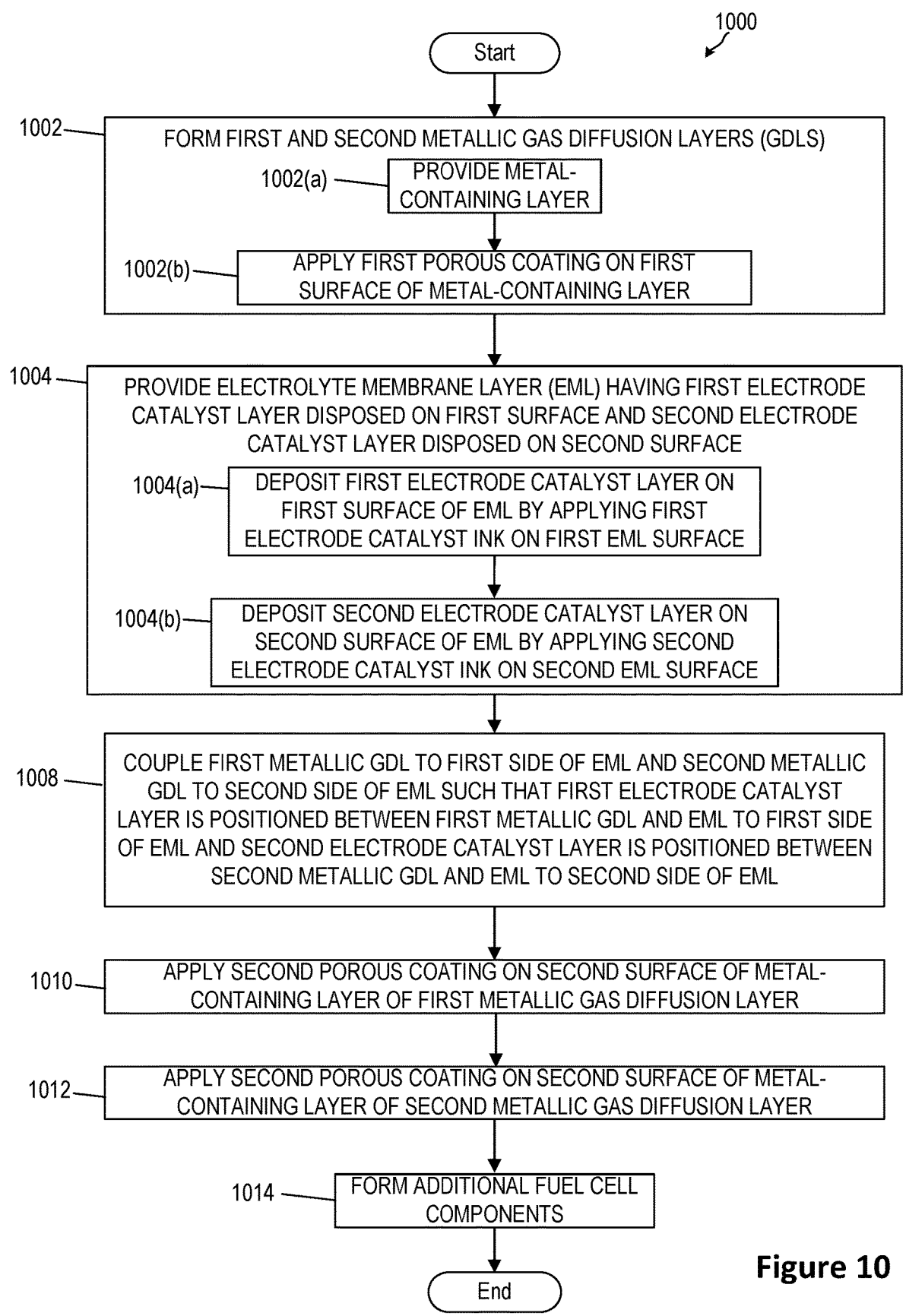
FIG. 10 illustrates an example method for forming a membrane electrode assembly and associated fuel cell, according to certain embodiments.

FIG. 10 illustrates an example method 1000 for forming a membrane electrode assembly and associated fuel cell, according to certain embodiments. In certain embodiments, method 1000 is generally analogous to process 800. With method 900, described above, electrode catalyst layers 110a and 110b are combined with metallic gas diffusion layers 112a and 112b, respectively, prior to being combined with electrolyte membrane layer 106. With method 1000, electrode catalyst layers 110a and 110b are combined with respective opposing surfaces of electrolyte membrane layer 106 prior to combining the resulting combined structure with metallic gas diffusion layers 112a and 112b. At least portions of method 1000 may correspond to a CCM technique.

At block 1002, first metallic gas diffusion layer 112a and second metallic gas diffusion layer 112b are formed. Block 1002 may generally correspond to block 902 of method 900, the features of which are incorporated by reference, and to FIG. 8B (and the associated portions of process 800), the details of which also are incorporated by reference. At this state, the combination of metal-containing layer 114a and coating 116aa of porous material on a surface of metal-containing layer 114a to face an electrode catalyst layer 110a may be considered a metallic gas diffusion layer 112a for an anode (e.g., electrode 102a of membrane electrode assembly 100). Similarly, at this state, the combination of metal-containing layer 114b and coating 116ba of porous material on a surface of metal-containing layer 114b to face an electrode catalyst layer 110b may be considered a metallic gas diffusion layer 112b for a cathode (e.g., electrode 102b of membrane electrode assembly 100).

At block 1004, electrode catalyst layers 110 are formed on opposing surfaces of electrolyte membrane layer 106. In particular, electrode catalyst layer 110a is formed on a first surface of electrolyte membrane layer 106, and electrode catalyst layer 110b is formed on an opposing second surface of electrolyte membrane layer 106. The combined structure of electrolyte membrane layer 106 and electrode catalyst layers 110a/110b may be purchased from a suitable supplier or may be formed as part of the process for forming membrane electrode assembly 100. In certain embodiments, block 1004 generally corresponds to FIG. 7F (and the associated portions of process 700), the details of which are incorporated by reference.

To the extent the combined structure of electrolyte membrane layer 106 and electrode catalyst layers 110a/110b is formed as part of method 1000 (e.g., rather than purchased as a combined structure), block 1004 may include, at block 1004(a), depositing electrode catalyst layer 110a on a first surface of electrolyte membrane layer 106 by applying a first catalyst ink on the first surface of electrolyte membrane layer 106 and, at block 1004(b), depositing electrode catalyst layer 110b on a second surface of electrolyte membrane layer 106 by applying a second catalyst ink on the second surface of electrolyte membrane layer 106. To the extent electrode catalyst layers 110a and 110b are to cover only a portion of electrolyte membrane layer 106, a template may be used when depositing electrode catalyst layers 110a and 110b on opposing surfaces of electrolyte membrane layer 106 to control the area of deposition.

At block 1008, metallic gas diffusion layer 112a is coupled to a first side of the combined structure (e.g., the combined structure including electrode catalyst layer 110a to a first side of electrolyte membrane layer 106 and electrode catalyst layer 110b to a second side of electrolyte membrane layer 106) and metallic gas diffusion layer 112b is coupled to a second side of the combined structure (e.g., the combined structure including electrode catalyst layer 110a to a first side of electrolyte membrane layer 106 and electrode catalyst layer 110b to a second side of electrolyte membrane layer 106). For example, with metallic gas diffusion layer 112a positioned to a first side of the combined structure and metallic gas diffusion layer 112b positioned to a second side of the combined structure, metallic gas diffusion layer 112a, the combined structure, and metallic gas diffusion layer 112b may be pressed together, in directions 802a and 802b, using a hot press or other suitable pressing tool. The layers may be pressed together until the layers bond to form a layer stack, the layer stack being the membrane electrode assembly (e.g., membrane electrode assembly 100). This disclosure contemplates coupling the layers using any suitable technique.

As a result, electrode catalyst layer 110a is positioned between metallic gas diffusion layer 112a and electrolyte membrane layer 106 to the first side of electrolyte membrane layer 106 and electrode catalyst layer 110b is positioned between metallic gas diffusion layer 112b and electrolyte membrane layer 106 to the second side of the electrolyte membrane layer 106. In certain embodiments, block 1008 generally corresponds to FIG. 8C (and the associated portions of process 800), the details of which are incorporated by reference.

At this state, and possibly depending on whether second coatings 116ab and 116bb of porous material are deposited on metal-containing layers 114a and 114b, respectively (as described below with reference to blocks 1010 and 1012), the combination of electrode 102a, electrolyte membrane layer 106, and electrode 102b may be considered a membrane electrode assembly 100.

At block 1010, a second coating 116ab of porous material is deposited on another surface of metal-containing layer 114a of metallic gas diffusion layer 112a, and at block 1012, a second coating 116bb of porous material is deposited on another surface of metal-containing layer 114b of metallic gas diffusion layer 112b. For example, a second coating 116ab of porous material may be deposited on a surface of metal-containing layer 114a that faces away from electrode catalyst layer 110a of electrode 102a. As another example, a second coating 116bb of porous material may be deposited on a surface of metal-containing layer 114b that faces away from electrode catalyst layer 110b of electrode 102b. In certain embodiments, blocks 1010 and 1012 generally correspond to FIG. 8D (and the associated portions of process 800), the details of which are incorporated by reference.

At block 1014, additional fuel cell components may be formed. For example, the membrane electrode assembly formed using method 1000 (e.g., membrane electrode assembly 100, membrane electrode assembly 400, or membrane electrode assembly 500) may be assembled with one or more other components to form a fuel cell. For example, the fuel cell may be similar to fuel cell 600, described above with reference to FIG. 6. The one or more other components may include one or more gaskets 608, one or more current collectors, one or more bipolar end plates 602, and/or any other suitable components.

Method 1000 may be repeated to form additional membrane electrode assemblies and/or fuel cells.

The membrane electrode assemblies and/or fuel cells described herein may be used for a variety of electronic devices and load. In some embodiments, the electronic device is a vehicle such as a rotorcraft, and the load is a device of the rotorcraft, such as a power converter, which may be part of an engine or propulsion unit of the rotorcraft.

Figure 11:
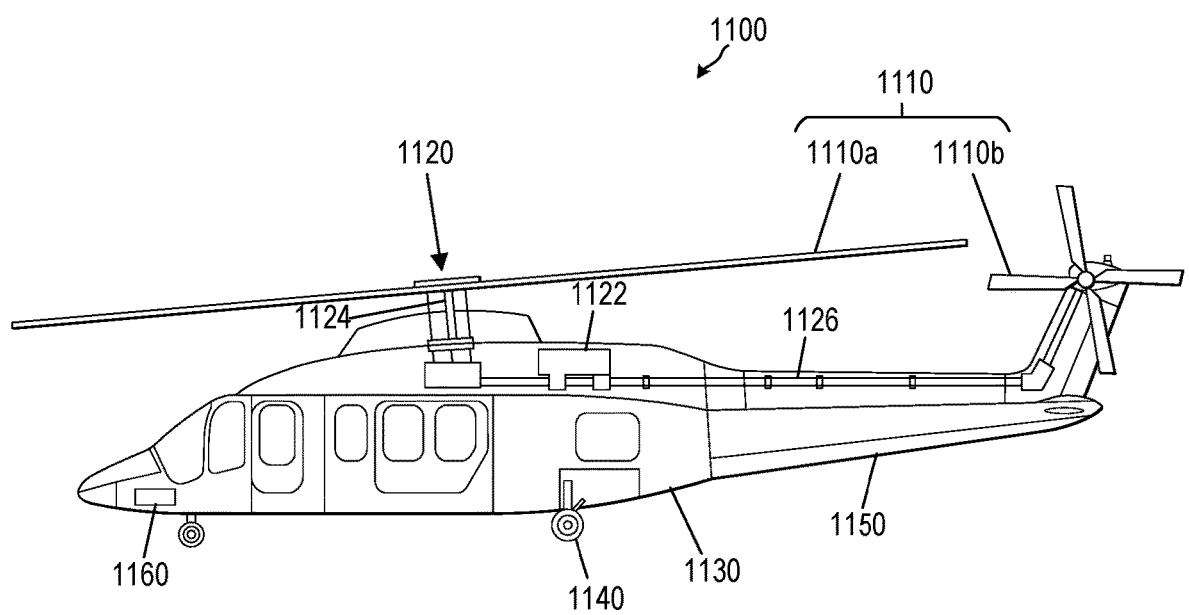
FIG. 11 illustrates aspects of an example rotorcraft, according to certain embodiments.

FIG. 11 illustrates aspects of an example rotorcraft 1100, according to certain embodiments. Rotorcraft 1100 includes rotor blades 1110, a powertrain 1120, a fuselage 1130, landing gear 1140, an empennage 1150, and rotorcraft computers 1160. It should be appreciated that some of teachings from rotorcraft 1100 may apply to aircraft other than rotorcraft, such as airplanes, tilt rotor aircraft, unmanned aircraft, and the like.

Rotor blades 1110 include main rotor blades 1110a and tail rotor blades 1110b. Powertrain 1120 rotates main rotor blades 1110a and optionally the tail rotor blades 1110b. Powertrain 1120 includes one or more engines 1122, a rotor mast 1124, and a drive shaft 1126. Engines 1122 supply torque to rotor mast 1124 via drive shaft 1126 to rotate main rotor blades 1110a. Engines 1122 may also supply torque to drive shaft 1126 to rotate tail rotor blades 1110b.

Fuselage 1130 represents the body of rotorcraft 1100 and is coupled to powertrain 1120 such that powertrain 1120 and rotor blades 1110 move fuselage 1130 through the air during operation. Landing gear 1140 supports rotorcraft 1100 when rotorcraft 1100 is grounded. Empennage 1150 represents the tail section of the aircraft and is connected to tail rotor blades 1110*b*. Powertrain 1120 and tail rotor blades 1110*b* may collectively provide thrust in the same direction as the rotation of main rotor blades 110*a*, so as to counter torque effects created by main rotor blades 1110*a*.

The rotorcraft 1100 includes flight control devices operable to change the flight characteristics of rotorcraft 1100. The flight control devices can be part of rotor blades 1110, powertrain 1120, fuselage 1130, and the like. The flight control devices include mechanical and/or electrical systems operable to change, e.g., the positions or angle of attack of rotor blades 1110, the power output of engines 1122, and the like. In some embodiments, the flight control devices include a swashplate for collectively or cyclically controlling the pitch of each of main rotor blades 1110A in order to selectively control direction, thrust, and lift of rotorcraft 1100. In some embodiments, the flight control devices include a tail rotor actuator for collectively controlling the pitch of tail rotor blades 1110*b* in order to selectively control yaw of rotorcraft 1100. In some embodiments, the flight control devices include an engine control computer for selectively varying the power output of engines 1122. Other examples of flight control devices include horizontal or vertical stabilizers, rudder, elevators, or other control or stabilizing surfaces that are used to control or stabilize flight of rotorcraft 1100.

Rotorcraft computers 1160 are operable to collect data about, or control flight of, rotorcraft 1100. Rotorcraft 1100 may be a fly-by-wire (FBW) rotorcraft, and rotorcraft computers 1160 include flight control computers (FCCs) operable to execute one or more control laws (CLAWS) that control flight of rotorcraft 1100. For example, rotorcraft computers 1160 can send electrical signals to engines 1122, the actuators for the swashplate, the tail rotor actuators, or the like to control flight of rotorcraft 1100. Rotorcraft computers 1160 may be operable to perform sensor data collection and analysis as part of a health and usage monitoring system (HUMS), a flight control system, a sensor system, a monitoring system, or the like.

Figure 12:
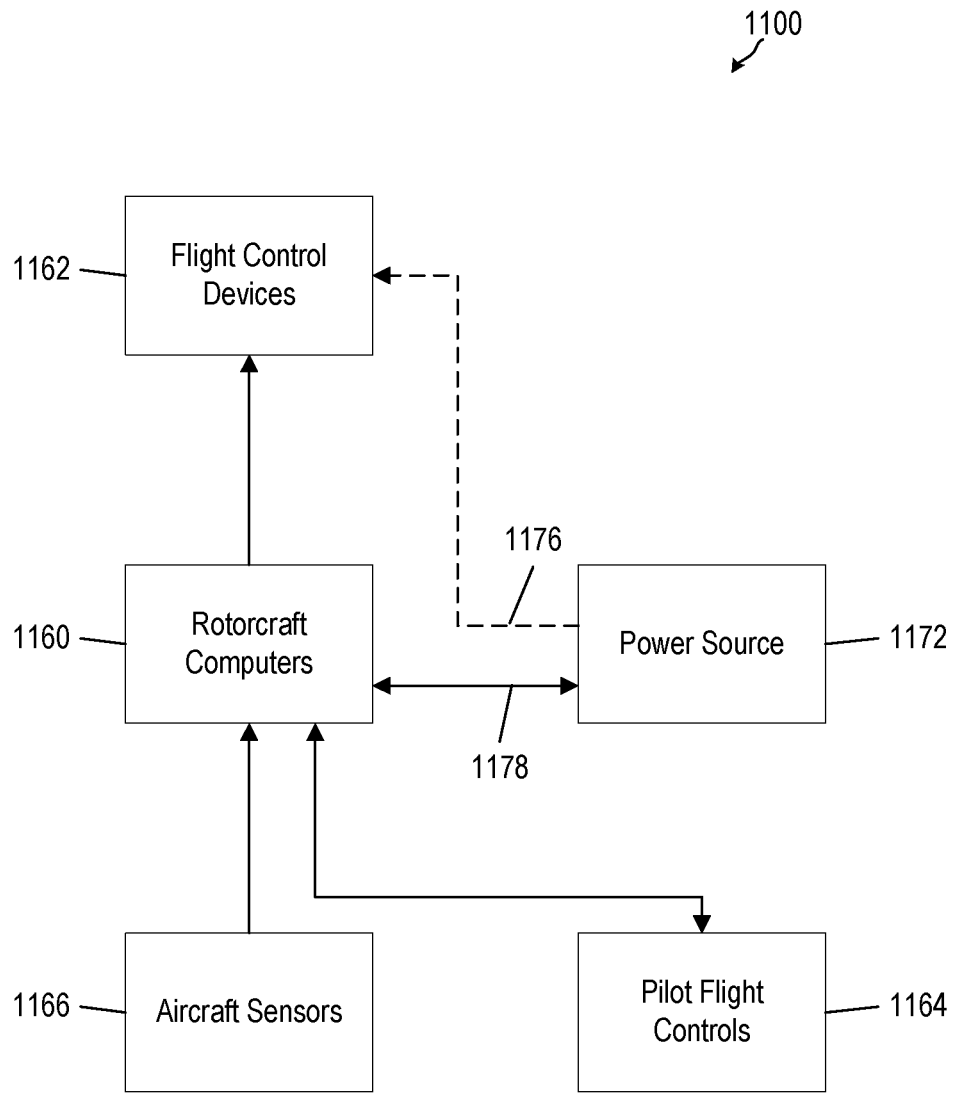
FIG. 12 is a block diagram of aspects of a rotorcraft, according to certain embodiments.

FIG. 12 is a block diagram of aspects of example rotorcraft 1100, according to certain embodiments. Specifically, features for controlling flight of rotorcraft 1100 are shown. Rotorcraft computers 1160 can be part of a flight control system used to control flight control devices 1162 (described above), thus controlling flight of rotorcraft 1100. Rotorcraft computers 1160 receive input signals from multiple sources, such as pilot flight controls 1164 and aircraft sensors 1166. Based on the input signals, rotorcraft computers 1160 transmit control signals to flight control devices 1162, which in certain embodiments may be an engine control computer of an engine.

Pilot flight controls 1164 include manual controls that a pilot may manipulate to control flight of rotorcraft 1100. Examples of pilot flight controls 1164 include a cyclic stick, a collective stick, pedals, and the like. In some embodiments, one or more of pilot flight controls 1164 include trim motors, which rotorcraft computers 1160 can command to move to a particular position, thereby providing flight control suggestions to the pilot.

Aircraft sensors 1166 include sensors for measuring a variety of rotorcraft systems, flight parameters, environmental conditions and the like. For example, aircraft sensors 1166 may include sensors for measuring airspeed, altitude, attitude, position, orientation, temperature, airspeed, vertical speed, and the like. Other aircraft sensors 1166 could include sensors relying upon data or signals originating external to rotorcraft 1100, such as a global positioning system sensor, a VHF Omnidirectional Range sensor, Instrument Landing System (ILS), and the like.

The components of rotorcraft 1100 (e.g., rotorcraft computers 1160, flight control devices 1162, etc.) are powered by a power source 1172. Power source 1172 may be a fuel cell, one or more collections of fuel cells, or the like. In some embodiments, power source 1172 is part of (e.g., disposed/installed in) a propulsion unit of rotorcraft 1100 (e.g., an engine 1122, see FIG. 11). In another embodiment, power source 1172 is part of other components of rotorcraft 1100.

Operation of power source 1172 may be controlled by a battery management system (BMS). For example, parameters of power source 1172 may be monitored by the BMS. For example, power source 1172 may include sensors for monitoring the discharge rate, voltages, temperature, and the like of power source 1172, from which the BMS receives signals. The BMS may be partially or wholly embodied as software and/or hardware for performing the desired functionality. For example, the BMS may be embodied as software executed by rotorcraft computers 1160, as hardware included with rotorcraft computers 1160, as a stand-alone management circuit/controller, or the like. In the illustrated embodiment, the BMS is embodied as software executed by rotorcraft computers 1160.

Power source 1172 is connected to the components of rotorcraft 1100 (e.g., flight control devices 1162) by power connections 1176, and the power source 1172 is connected to the BMS (e.g., rotorcraft computers 1160) by data connections 1178. Power connections 1176 carry the power provided to the components of rotorcraft 1100. Data connections 1178 carry data (e.g., control and/or sensor) signals communicated between the power source 1172 and rotorcraft computers 1160. Data connections 1178 may be connections for a serial communications protocol, such as PC, SPI, RS232, or the like. Power connections 1176 may be larger (e.g., have a lower gauge) than data connections 1178.

In certain embodiments, power source 1172 is formed in accordance with this disclosure. For example, power source 1172 may be formed, at least in part, using process 700, process 800, method 900, or method 1000. In certain embodiments, power source 1172 could be implemented, at least in part, as fuel cell 600 or to otherwise include one or more membrane electrode assemblies according to this disclosure. Implementing power source 1172 using metallic gas diffusion layers 112 in accordance with this disclosure may result in power source 1172 potentially having increased energy density and thermal performance relative to fuel cells formed using conventional gas diffusion layers.

Embodiments of this disclosure may provide none, some, or all of the following technical advantages. Furthermore, other advantages may be described in or understood from this disclosure.

In certain embodiments, including metallic gas diffusion layers in electrodes of a fuel cell may improve the electrical conductivity of the electrode and the associated membrane electrode assembly. In certain embodiments, having an inherently conductive substrate/core (e.g., metal-containing layer 114) in the metallic gas diffusion layer (e.g., metallic gas diffusion layer 112) may increase electrical efficiency of an electrode 102 that includes the metallic gas diffusion layer, as well as of the associated membrane electrode assembly. For example, on the anode side the metallic gas diffusion layer (e.g., metallic gas diffusion layer 112*a*) may more efficiently deliver electrons to an anode terminal of the fuel cell, directly or indirectly. As another example, on the cathode side the metallic gas diffusion layer (e.g., metallic gas diffusion layer 112b) may more efficiently join the electrons returned via the positive terminal and the positively-charged ions received via the electrolyte membrane layer and cathode electrode layer with the reactant gas (e.g., oxygen) to form the byproduct (e.g., water).

In certain embodiments, including metallic gas diffusion layer in an electrode of a fuel cell may improve the thermal performance of the electrode and the associated membrane electrode assembly. On the anode side, the reaction associated with the fuel may release heat, and including an inherently conductive substrate/core (e.g., metal-containing layer 114a) in the gas diffusion layer (e.g., gas diffusion layer 112a) may more evenly distribute the heat throughout the electrode (e.g., electrode 102a), resulting in better thermal heat dissipation for the electrode 102a that includes the metallic gas diffusion layer 112a, as well as of the associated membrane electrode assembly. On the cathode side, the reduction reaction also may release heat, and including an inherently conductive substrate/core (e.g., metal-containing layer 114b) in the metallic gas diffusion layer (e.g., metallic gas diffusion layer 112b) may more evenly distribute the heat throughout the electrode (e.g., electrode 102b), resulting in better thermal heat dissipation for the electrode 102b that includes the metallic gas diffusion layer 112b, as well as of the associated membrane electrode assembly.

In certain embodiments, combining one or more coatings 116 of porous materials and a metal-containing layer 114 (e.g., a metal mesh or metal foam) may provide a gas diffusion layer that has a high surface area and good porosity, but that is also highly conductive unlike conventional gas diffusion layers.

In certain embodiments, including metallic gas diffusion layers in electrodes of a fuel cell may improve performance of the membrane electrode assembly and associated fuel cell by about 15% to about 50% relative to fuel cells that include conventional membrane electrode assemblies that include conventional gas diffusion layers made from woven or non-woven carbon cloth, carbon paper, or other such materials that lack inherent conductivity. Such improved performance may be based on a power polarization measurement of power density (e.g., milliwatts/cm$^2$) to current (e.g., A). It should be understood that these performance gains are provided for example purposes only; particular performance gains may be based on particular implementation details and other considerations.

Embodiments can be applied to any suitable type of fuel cell form factor. Additionally, embodiments could be implemented as a single fuel cell or a set of two or more fuel cells arranged in a suitable manner (e.g., a fuel cell stack of two or more fuel cells).

Particular example implementations of a membrane electrode assembly 100 and fuel cell 600 are described below that are based, at least in part, on concepts described herein. It should be understood that these example implementations and associated performance metrics are provided as examples only and might or might not apply to a particular implementation.

As a first example implementation, electrolyte membrane layer 114 is a NAFION 117 membrane. Metallic gas diffusion layers 112a and 112b each include an OPTIVEIL metal-containing layer 114 with coatings 116 of a porous material of about 4 mg/cm$^2$ KETJENBLACK with 5 weight percent (wt %) PTFE binder. Continuing with this example, electrode catalyst layer 110a (e.g., an anode catalyst layer) may about 8 mg/cm$^2$ of platinum-ruthenium black with about 3% NAFION ionomer binder, and electrode catalyst layer 110b (e.g., a cathode catalyst layer) may about 8 mg/cm$^2$ of platinum black with about 3% NAFION ionomer binder. A fuel cell incorporating this example membrane electrode assembly 100 may use about 10% aqueous ethanol as fuel and air as an oxidant. As just one example, the power achieved may be about 25 milliwatts (mW)/cm$^2$.

As a second example implementation, electrolyte membrane layer 114 is a NAFION 11 membrane. Metallic gas diffusion layers 112a and 112b each include an OPTIVEIL metal-containing layer 114 with coatings 116 of a porous material of about 6 mg/cm$^2$ KETJENBLACK with 5 wt % PTFE binder. Continuing with this example, electrode catalyst layer 110a (e.g., an anode catalyst layer) may about 4 mg/cm$^2$ of 40% platinum/KETJENBLACK with about 3% NAFION ionomer binder, and electrode catalyst layer 110b (e.g., a cathode catalyst layer) may about 4 mg/cm$^2$ of 80% platinum/KETJENBLACK with about 3% NAFION ionomer binder. A fuel cell incorporating this example membrane electrode assembly 100 may use hydrogen as fuel and air as an oxidant. As just one example, the power achieved may be about 1100 mW/cm$^2$.

Of course, for both of these first and second example implementations, the particular operating conditions and other factors that may affect the power achieved may vary.

Example embodiments of this disclosure are summarized here. Other embodiments can also be understood from the entirety of the specification as well as the claims filed herein.

Example 1. An apparatus includes an electrolyte membrane layer, a first electrode catalyst layer positioned to a first side of the electrolyte membrane layer, and a first metallic gas diffusion layer positioned to the first side of the electrolyte membrane layer such that the first electrode catalyst layer is positioned between the first metallic gas diffusion layer and the electrolyte membrane layer. The first metallic gas diffusion layer includes a metal-containing layer and a first coating of porous material disposed on a first surface of the metal-containing layer of the first metallic gas diffusion layer. The first surface of the metal-containing layer of the first metallic gas diffusion layer faces the first electrode catalyst layer. The apparatus further includes a second electrode catalyst layer positioned to a second side of the electrolyte membrane layer and a second metallic gas diffusion layer positioned to the second side of the electrolyte membrane layer such that the second electrode catalyst layer is positioned between the second metallic gas diffusion layer and the electrolyte membrane layer. The second metallic gas diffusion layer includes a metal-containing layer and a first coating of porous material disposed on a first surface of the metal-containing layer of the second metallic gas diffusion layer. The first surface of the metal-containing layer of the second metallic gas diffusion layer faces the second electrode catalyst layer.

Example 2. The apparatus of Example 1, where the first electrode catalyst layer and the first metallic gas diffusion layer form a first electrode that is configured to operate as an anode in a fuel cell; and the second electrode catalyst layer and the second metallic gas diffusion layer form a second electrode that is configured to operate as a cathode in the fuel cell.

Example 3. The apparatus of any one of Examples 1 and 2, where the metal-containing layer of the first metallic gas diffusion layer includes a tab that is uncovered by porous material and is configured to electrically connect, directly or indirectly, to a first terminal of a fuel cell; and the metal-containing layer of the second metallic gas diffusion layer includes a tab that is uncovered by porous material and is configured to electrically connect, directly or indirectly, to a second terminal of a fuel cell, wherein the first terminal is configured to have a first polarity and the second terminal is configured to have a second polarity.

Example 4. The apparatus of Example 3, further including a second coating of porous material disposed on a second surface of the metal-containing layer of the first metallic gas diffusion layer, the second surface of the metal-containing layer of the first metallic gas diffusion layer facing away from the first electrode catalyst layer; and a second coating of porous material disposed on a second surface of the metal-containing layer of the second metallic gas diffusion layer, the second surface of the metal-containing layer of the second metallic gas diffusion layer facing away from the second electrode catalyst layer.

Example 5. The apparatus of any one of Examples 1-4, further including a bonding material positioned between the electrolyte membrane layer and the first electrode catalyst layer.

Example 6. The apparatus of any one of Examples 1-5, further including a current collector layer positioned to a side of the first metallic gas diffusion layer that faces away from the electrolyte membrane layer.

Example 7. The apparatus of any one of Examples 1-6, where the electrolyte membrane layer includes a polymer electrolyte membrane.

Example 8. The apparatus of any one of Examples 1-7, where the metal-containing layer of the first gas diffusion layer comprises a metal mesh or a metal foam; and the metal-containing layer of the second gas diffusion layer comprises a metal mesh or a metal foam.

Example 9. The apparatus of any one of Examples 1-8, further including a pair of bipolar end plates. Each end plate of the pair of bipolar end plates includes flow channels. The first metallic gas diffusion layer, the first electrode catalyst layer, the electrolyte membrane layer, the second electrode catalyst layer, and the second metallic gas diffusion layer are sandwiched between the pair of bipolar end plates.

Example 10. A method includes forming first and second metallic gas diffusion layers for a fuel cell. Forming each of the first and second metallic gas diffusion layers includes providing a metal-containing layer and applying a first porous coating on a first surface of the metal-containing layer. The method further includes depositing a first electrode catalyst layer on the first porous coating of the first metallic gas diffusion layer and depositing a second electrode catalyst layer on the first porous coating of the second metallic gas diffusion layer. The method further includes coupling the first metallic gas diffusion layer and the first electrode catalyst layer to a first side of an electrolyte membrane layer and the second metallic gas diffusion layer and the second electrode catalyst layer to a second side of the electrolyte membrane layer. The first electrode catalyst layer is positioned between the first metallic gas diffusion layer and the electrolyte membrane layer to the first side of the electrolyte membrane layer, and the second electrode catalyst layer is positioned between the second metallic gas diffusion layer and the electrolyte membrane layer to the second side of the electrolyte membrane layer.

Example 11. The method of Example 10, where, for each of the first and second metallic gas diffusion layers, the method further includes preparing, prior to applying the first porous coating on the first surface of the metal-containing layer, the metal-containing layer. Preparing the metal-containing layer includes washing the metal-containing layer in acid, rinsing the metal-containing layer in deionized water, and drying the metal-containing layer.

Example 12. The method of any one of Examples 10-11, wherein, for each of the first and second metallic gas diffusion layers, applying the first porous coating on the first surface of the metal-containing layer includes heating the metal-containing layer and applying a porous layer ink on the first surface of the metal-containing layer to form the first porous coating. The porous layer ink includes a slurry formed from a powder, a hydrophobic binder, and a solvent.

Example 13. The method of Example 12, where the powder includes a carbon powder, the hydrophobic binder includes PTFE, and the solvent includes ethanol or isopropyl alcohol.

Example 14. The method of any one of Examples 10-13, where, for each of the first and second metallic gas diffusion layers, applying the first porous coating on the first surface of the metal-containing layer includes applying the first porous coating on the first surface of the metal-containing layer until a target areal density is reached.

Example 15. The method of any one of Examples 10-14, where, for each of the first and second metallic gas diffusion layers, the method further includes applying a second porous coating on a second surface of the metal-containing layer.

Example 16. The method of any one of Examples 10-15, where coupling the first metallic gas diffusion layer and the first electrode catalyst layer to the first side of the electrolyte membrane layer and the second metallic gas diffusion layer and the second electrode catalyst layer to the second side of the electrolyte membrane layer includes hot-pressing the first metallic gas diffusion layer and the first electrode catalyst layer to the first side of the electrolyte membrane layer and the second metallic gas diffusion layer and the second electrode catalyst layer to the second side of the electrolyte membrane layer.

Example 17. The method of any one of Examples 10-16, further including applying, prior to coupling the first metallic gas diffusion layer and the first electrode catalyst layer to the first side of the electrolyte membrane layer and the second metallic gas diffusion layer and the second electrode catalyst layer to the second side of the electrolyte membrane layer, a bonding material to a surface of the first electrode catalyst layer to face the first side of the electrolyte membrane layer and a surface of the second electrode catalyst layer to face the second side of the electrolyte membrane layer. The bonding material is configured to facilitate bonding of the first electrode catalyst layer to the first side of the electrolyte membrane layer and the second electrode catalyst layer to the second side of the electrolyte membrane layer.

Example 18. The method of any one of Examples 10-17, where depositing the first electrode catalyst layer on the first porous coating of the first metallic gas diffusion layer includes applying a first electrode catalyst ink on the first porous coating of the first metallic gas diffusion layer, the first electrode catalyst ink including a first electrode catalyst material; and depositing the second electrode catalyst layer on the first porous coating of the second metallic gas diffusion layer includes applying a second electrode catalyst ink on the first porous coating of the second metallic gas diffusion layer, the second electrode catalyst ink including a second electrode catalyst material. The second electrode catalyst material is different than the first electrode catalyst material.

Example 19. A method includes forming first and second metallic gas diffusion layers for a fuel cell. Forming each of the first and second metallic gas diffusion layers includes providing a metal-containing layer and applying a first porous coating on a first surface of the metal-containing layer. The method further includes providing an electrolyte membrane layer having a first catalyst layer disposed on a first surface of the electrolyte membrane layer and a second catalyst layer disposed on a second surface of the electrolyte membrane layer, the first surface of the electrolyte membrane layer being opposite the first surface of the electrolyte membrane layer. The method further includes coupling the first metallic gas diffusion layer to a first side of the electrolyte membrane layer and the second metallic gas diffusion layer to a second side of the electrolyte membrane layer such that the first catalyst layer is positioned between the first metallic gas diffusion layer and the electrolyte membrane layer to the first side of the electrolyte membrane layer and the second catalyst layer is positioned between the second metallic gas diffusion layer and the electrolyte membrane layer to the second side of the electrolyte membrane layer. The first porous coating on the first surface of the metal-containing layer of the first metallic gas diffusion layer contacts the first catalyst layer, and the first porous coating on the first surface of the metal-containing layer of the second metallic gas diffusion layer contacts the second catalyst layer.

Example 20. The method of Example 19, where providing the electrolyte membrane layer having the first catalyst layer disposed on the first surface of the electrolyte membrane layer and the second catalyst layer disposed on the second surface of the electrolyte membrane layer includes: depositing the first catalyst layer on the first surface of the electrolyte membrane layer by applying a first catalyst ink on the first surface of the electrolyte membrane layer and depositing the second catalyst layer on the second surface of the electrolyte membrane layer by applying a second catalyst ink on the second surface of the electrolyte membrane layer; or providing the electrolyte membrane layer with the first catalyst layer having been pre-deposited on the first surface of the electrolyte membrane layer and the second catalyst layer having been pre-deposited on the second surface of the electrolyte membrane layer.

Illustrative embodiments of the system and method of the present disclosure are described above. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. An apparatus, comprising:
an electrolyte membrane layer;
a first electrode catalyst layer positioned to a first side of the electrolyte membrane layer;
a first metallic gas diffusion layer positioned to the first side of the electrolyte membrane layer such that the first electrode catalyst layer is positioned between the first metallic gas diffusion layer and the electrolyte membrane layer, wherein the first metallic gas diffusion layer comprises a metal-containing layer and a first coating of porous material disposed on a first surface of the metal-containing layer of the first metallic gas diffusion layer, the first surface of the metal-containing layer of the first metallic gas diffusion layer facing the first electrode catalyst layer, wherein the metal-containing layer of the first gas diffusion layer comprises a non-woven metal fabric, wherein:
diameters of pores of the metal-containing layer are in a range of 1 micrometers (μm) to 100 μm;
the first coating of porous material has an areal density of 4 milligrams to square centimeters (mg/cm$^2$) to 7 mg/cm$^2$;
diameters of pores of the first coating of porous material are 2 nanometers (nm) or less; and
a thickness of the first coating of porous material disposed on the first surface of the metal-containing layer is 2 μm to 10 μm;
a second electrode catalyst layer positioned to a second side of the electrolyte membrane layer;
a second metallic gas diffusion layer positioned to the second side of the electrolyte membrane layer such that the second electrode catalyst layer is positioned between the second metallic gas diffusion layer and the electrolyte membrane layer, wherein the second metallic gas diffusion layer comprises a metal-containing layer and a first coating of porous material disposed on a first surface of the metal-containing layer of the second metallic gas diffusion layer, the first surface of the metal-containing layer of the second metallic gas diffusion layer facing the second electrode catalyst layer, wherein the metal-containing layer of the second gas diffusion layer comprises a non-woven metal fabric.

2. The apparatus of claim 1, wherein:
the first electrode catalyst layer and the first metallic gas diffusion layer form a first electrode that is configured to operate as an anode in a fuel cell; and
the second electrode catalyst layer and the second metallic gas diffusion layer form a second electrode that is configured to operate as a cathode in the fuel cell.

3. The apparatus of claim 1, wherein:
the metal-containing layer of the first metallic gas diffusion layer comprises a tab that is uncovered by porous material and is configured to electrically connect, directly or indirectly, to a first terminal of a fuel cell; and
the metal-containing layer of the second metallic gas diffusion layer comprises a tab that is uncovered by porous material and is configured to electrically connect, directly or indirectly, to a second terminal of a fuel cell, wherein the first terminal is configured to have a first polarity and the second terminal is configured to have a second polarity.

4. The apparatus of claim 3, further comprising:
a second coating of porous material disposed on a second surface of the metal-containing layer of the first metallic gas diffusion layer, the second surface of the metal-containing layer of the first metallic gas diffusion layer facing away from the first electrode catalyst layer; and
a second coating of porous material disposed on a second surface of the metal-containing layer of the second metallic gas diffusion layer, the second surface of the metal-containing layer of the second metallic gas diffusion layer facing away from the second electrode catalyst layer.

5. The apparatus of claim 1, further comprising a bonding material positioned between the electrolyte membrane layer and the first electrode catalyst layer.

6. The apparatus of claim 1, further comprising a current collector layer positioned to a side of the first metallic gas diffusion layer that faces away from the electrolyte membrane layer.

7. The apparatus of claim 1, wherein the electrolyte membrane layer comprises a polymer electrolyte membrane.

8. The apparatus of claim 1, further comprising a pair of bipolar end plates, wherein:
each end plate of the pair of bipolar end plates comprises flow channels; and
the first metallic gas diffusion layer, the first electrode catalyst layer, the electrolyte membrane layer, the second electrode catalyst layer, and the second metallic gas diffusion layer are sandwiched between the pair of bipolar end plates.

9. The apparatus of claim 1, wherein:
the non-woven metal fabric of the metal-containing layer of the first gas diffusion layer comprises a first metal material; and
the non-woven metal fabric of the metal-containing layer of the second gas diffusion layer comprises a different second metal material.

10. The apparatus of claim 1, wherein a perimeter portion of the metal-containing layer of the first metallic gas diffusion layer is uncovered by the first coating of porous material.

11. A method, comprising:
forming first and second metallic gas diffusion layers for a fuel cell, wherein forming each of the first and second metallic gas diffusion layers comprises:
providing a metal-containing layer;
preparing the metal-containing layer, wherein preparing the metal-containing layer comprises:
washing the metal-containing layer in acid;
rinsing the metal-containing layer in deionized water; and
drying the metal-containing layer; and
applying, after preparing the metal-containing layer, a first porous coating on a first surface of the metal-containing layer,
wherein the metal-containing layer comprises a non-woven metal fabric;
depositing a first electrode catalyst layer on the first porous coating of the first metallic gas diffusion layer;
depositing a second electrode catalyst layer on the first porous coating of the second metallic gas diffusion layer; and
coupling the first metallic gas diffusion layer and the first electrode catalyst layer to a first side of an electrolyte membrane layer and the second metallic gas diffusion layer and the second electrode catalyst layer to a second side of the electrolyte membrane layer such that the first electrode catalyst layer is positioned between the first metallic gas diffusion layer and the electrolyte membrane layer to the first side of the electrolyte membrane layer and the second electrode catalyst layer is positioned between the second metallic gas diffusion layer and the electrolyte membrane layer to the second side of the electrolyte membrane layer.

12. The method of claim 11, wherein, for each of the first and second metallic gas diffusion layers, applying the first porous coating on the first surface of the metal-containing layer comprises: heating the metal-containing layer; and applying a porous layer ink on the first surface of the metal-containing layer to form the first porous coating, the porous layer ink comprising a slurry formed from a powder, a hydrophobic binder, and a solvent.

13. The method of claim 12, wherein:
the powder comprises a carbon powder;
the hydrophobic binder comprises polytetrafluoroethylene (PTFE); and
the solvent comprises ethanol or isopropyl alcohol.

14. The method of claim 11, wherein, for each of the first and second metallic gas diffusion layers, applying the first porous coating on the first surface of the metal-containing layer comprises applying the first porous coating on the first surface of the metal-containing layer until a target areal density is reached.

15. The method of claim 11, wherein, for each of the first and second metallic gas diffusion layers, the method further comprises applying a second porous coating on a second surface of the metal-containing layer.

16. The method of claim 11, wherein coupling the first metallic gas diffusion layer and the first electrode catalyst layer to the first side of the electrolyte membrane layer and the second metallic gas diffusion layer and the second electrode catalyst layer to the second side of the electrolyte membrane layer comprises hot-pressing the first metallic gas diffusion layer and the first electrode catalyst layer to the first side of the electrolyte membrane layer and the second metallic gas diffusion layer and the second electrode catalyst layer to the second side of the electrolyte membrane layer.

17. The method of claim 11, further comprising applying, prior to coupling the first metallic gas diffusion layer and the first electrode catalyst layer to the first side of the electrolyte membrane layer and the second metallic gas diffusion layer and the second electrode catalyst layer to the second side of the electrolyte membrane layer, a bonding material to a surface of the first electrode catalyst layer to face the first side of the electrolyte membrane layer and a surface of the second electrode catalyst layer to face the second side of the electrolyte membrane layer, the bonding material configured to facilitate bonding of the first electrode catalyst layer to the first side of the electrolyte membrane layer and the second electrode catalyst layer to the second side of the electrolyte membrane layer.

18. The method of claim 11, wherein:
depositing the first electrode catalyst layer on the first porous coating of the first metallic gas diffusion layer comprises applying a first electrode catalyst ink on the first porous coating of the first metallic gas diffusion layer, the first electrode catalyst ink comprising a first electrode catalyst material; and
depositing the second electrode catalyst layer on the first porous coating of the second metallic gas diffusion layer comprises applying a second electrode catalyst ink on the first porous coating of the second metallic gas diffusion layer, the second electrode catalyst ink comprising a second electrode catalyst material, the second electrode catalyst material being different than the first electrode catalyst material.

19. A method, comprising:

forming first and second metallic gas diffusion layers for a fuel cell, wherein forming each of the first and second metallic gas diffusion layers comprises:
  providing a metal-containing layer; and
  applying a first porous coating on a first surface of the metal-containing layer, wherein applying the first porous coating on the first surface of the metal-containing layer comprises:
    positioning the metal-containing layer on a hot plate;
    heating the metal-containing layer; and
    applying, while heating the metal-containing layer, a porous layer ink on the first surface of the metal-containing layer to form the first porous coating;
providing an electrolyte membrane layer having a first catalyst layer disposed on a first surface of the electrolyte membrane layer and a second catalyst layer disposed on a second surface of the electrolyte membrane layer, the first surface of the electrolyte membrane layer being opposite the first surface of the electrolyte membrane layer; and
coupling the first metallic gas diffusion layer to a first side of the electrolyte membrane layer and the second metallic gas diffusion layer to a second side of the electrolyte membrane layer such that the first catalyst layer is positioned between the first metallic gas diffusion layer and the electrolyte membrane layer to the first side of the electrolyte membrane layer and the second catalyst layer is positioned between the second metallic gas diffusion layer and the electrolyte membrane layer to the second side of the electrolyte membrane layer, the first porous coating on the first surface of the metal-containing layer of the first metallic gas diffusion layer contacting the first catalyst layer, the first porous coating on the first surface of the metal-containing layer of the second metallic gas diffusion layer contacting the second catalyst layer.

20. The method of claim 19, wherein providing the electrolyte membrane layer having the first catalyst layer disposed on the first surface of the electrolyte membrane layer and the second catalyst layer disposed on the second surface of the electrolyte membrane layer comprises:
  depositing the first catalyst layer on the first surface of the electrolyte membrane layer by applying a first catalyst ink on the first surface of the electrolyte membrane layer and depositing the second catalyst layer on the second surface of the electrolyte membrane layer by applying a second catalyst ink on the second surface of the electrolyte membrane layer; or
  providing the electrolyte membrane layer with the first catalyst layer having been pre-deposited on the first surface of the electrolyte membrane layer and the second catalyst layer having been pre-deposited on the second surface of the electrolyte membrane layer.

* * * * *